US006741606B1

(12) United States Patent
Mori

(10) Patent No.: US 6,741,606 B1
(45) Date of Patent: May 25, 2004

(54) INTERFACE CONTROL APPARATUS

(75) Inventor: Junichi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,358

(22) Filed: Dec. 2, 1998

(30) Foreign Application Priority Data

Dec. 5, 1997 (JP) ........................................... 9-335679

(51) Int. Cl.[7] ............................................. H04L 12/66

(52) U.S. Cl. ....................... 370/463; 370/429; 370/412

(58) Field of Search ................................ 370/463, 412, 370/428, 429, 395.4, 395.41, 395.43, 395.5, 389, 465, 466

(56) References Cited

U.S. PATENT DOCUMENTS 5,349,649 A * 9/1994 Iijima ......................... 709/228
5,408,614 A 4/1995 Thornton et al. ........... 395/275
5,550,957 A * 8/1996 Davidson, Jr. et al. .... 358/1.15
5,651,114 A * 7/1997 Davidson, Jr. .............. 709/229
5,666,558 A * 9/1997 Pipkins ....................... 710/31
5,754,803 A * 5/1998 Regis ......................... 395/299
5,805,922 A * 9/1998 Sim et al. ...................... 710/5
5,901,325 A * 5/1999 Cox ............................. 710/1
5,991,520 A * 11/1999 Smyers et al. .............. 710/100
5,991,842 A * 11/1999 Takayama .................. 710/105
6,038,400 A * 3/2000 Bell et al. ..................... 710/11
6,052,204 A * 4/2000 Mori et al. ................. 358/296
6,292,267 B1 * 9/2001 Mori et al. ................ 358/1.15

FOREIGN PATENT DOCUMENTS

EP 0 621 538 A2 10/1994 ........... G06F/13/38
EP 0 795 831 A1 9/1997 ........... G06F/13/42

* cited by examiner

*Primary Examiner*—Dang Ton
*Assistant Examiner*—Tri H. Phan
(74) *Attorney, Agent, or Firm*—Fitzpatrick, Cella, Harper & Scinto

(57) ABSTRACT

In two-way communication with a host apparatus, when packet data is received, a packet protocol is used, and when nonpacket data is received, a nonpacket protocol is used. Control is performed so that the destination of each data in the received data is switched between a printing-data buffer storage and a control-command buffer storage depending on whether or not the packet protocol is to be used.

13 Claims, 33 Drawing Sheets

FIG.21

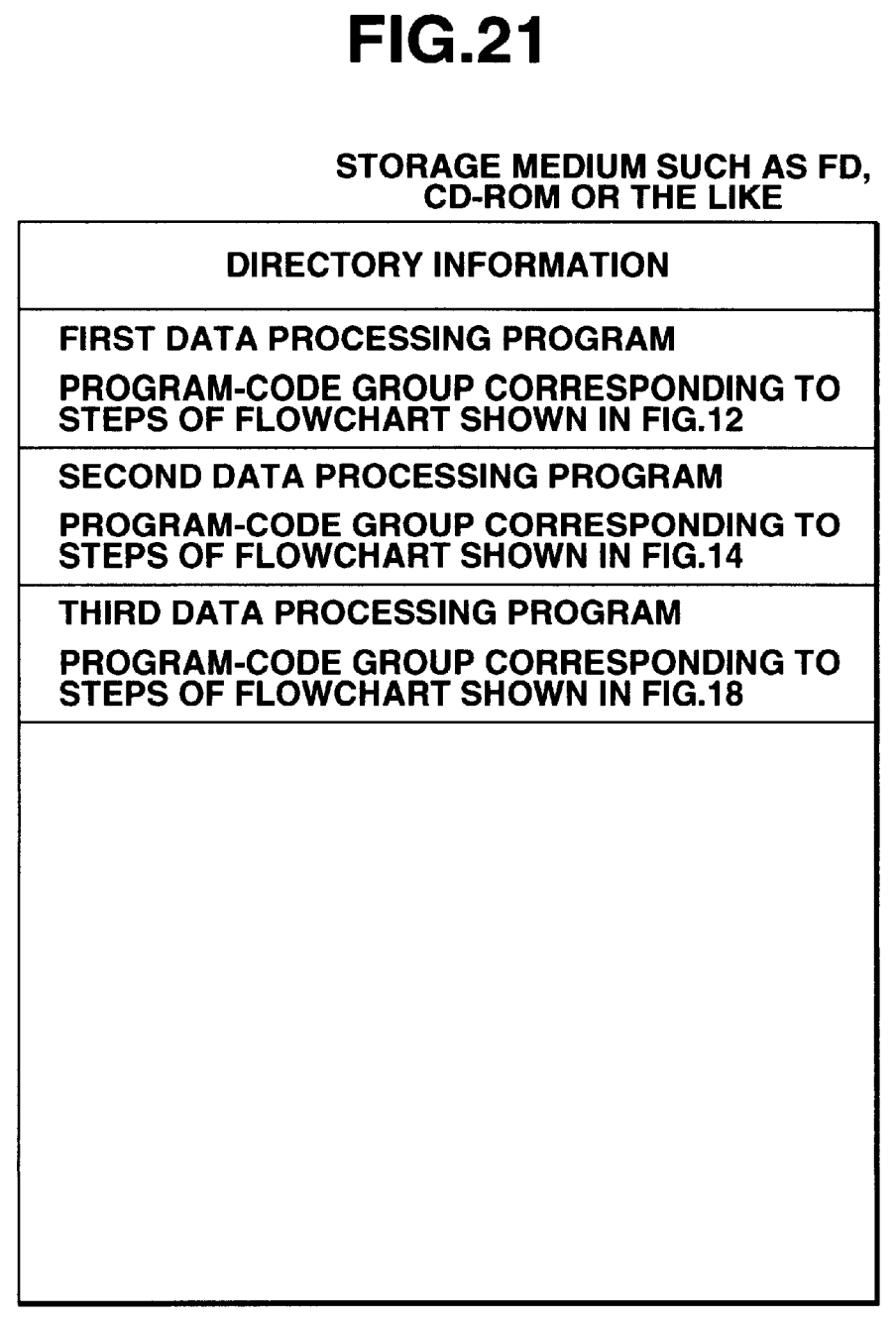

STORAGE MEDIUM SUCH AS FD, CD-ROM OR THE LIKE

| DIRECTORY INFORMATION |
|---|
| FIRST DATA PROCESSING PROGRAM<br>PROGRAM-CODE GROUP CORRESPONDING TO STEPS OF FLOWCHART SHOWN IN FIG.12 |
| SECOND DATA PROCESSING PROGRAM<br>PROGRAM-CODE GROUP CORRESPONDING TO STEPS OF FLOWCHART SHOWN IN FIG.14 |
| THIRD DATA PROCESSING PROGRAM<br>PROGRAM-CODE GROUP CORRESPONDING TO STEPS OF FLOWCHART SHOWN IN FIG.18 |
| |

DATA1~8 HIGH LOW

DATA STROBE HIGH LOW

ACK HIGH LOW

BUSY HIGH LOW

FIG.24
PRIOR ART

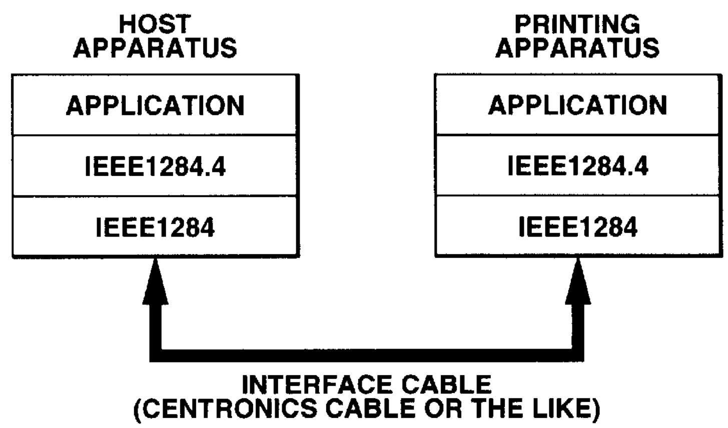

FIG.25
PRIOR ART

| | | | |
|---|---|---|---|
| HEADER PORTION H | FIRST BYTE | PRIMARY SOCKET ID (PSID) | SIZE : 1BYTE<br>CONTENTS : 0x00~0xFF |
| | SECOND BYTE | SECONDARY SOCKET ID (SSID) | SIZE : 1BYTE<br>CONTENTS : 0x00~0xFF |
| | THIRD BYTE | LENGTH (NUMBER OF DATA, HIGH-ORDER BITS) | SIZE : 2BYTES<br>CONTENTS : 0x0006~0xFFFF |
| | FOURTH BYTE | LENGTH (NUMBER OF DATA, LOW-ORDER BITS) | |
| | FIFTH BYTE | CREDIT | SIZE : 1BYTE<br>CONTENTS : 0x00~0xFF |
| | SIXTH BYTE | CONTROL | SIZE : 1BYTE<br>CONTENTS : (USUALLY 0x00) |
| | | DATA | SIZE : 0~65529 |

FIG.26A
PRIOR ART

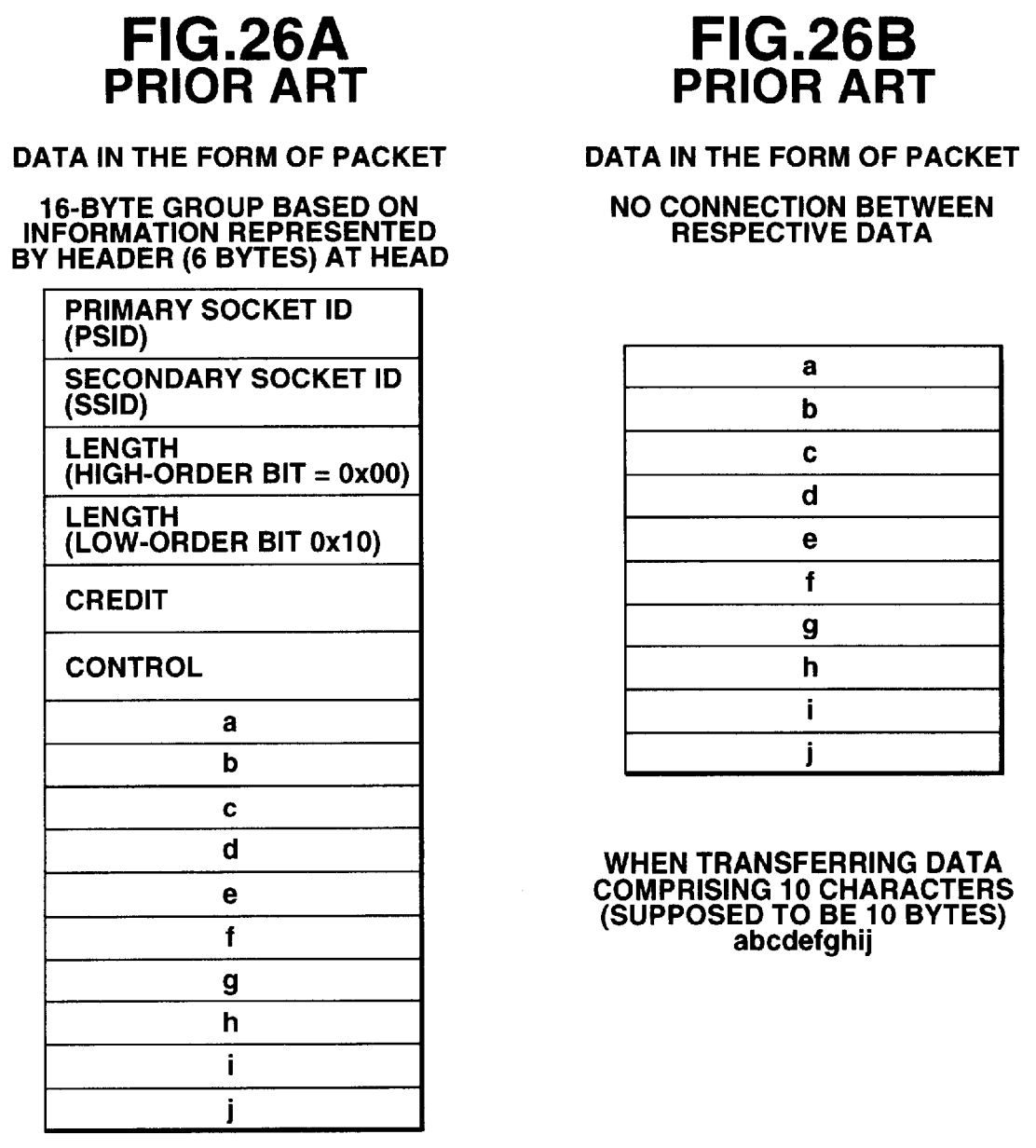

DATA IN THE FORM OF PACKET

16-BYTE GROUP BASED ON INFORMATION REPRESENTED BY HEADER (6 BYTES) AT HEAD

| PRIMARY SOCKET ID (PSID) |
|---|
| SECONDARY SOCKET ID (SSID) |
| LENGTH (HIGH-ORDER BIT = 0x00) |
| LENGTH (LOW-ORDER BIT 0x10) |
| CREDIT |
| CONTROL |
| a |
| b |
| c |
| d |
| e |
| f |
| g |
| h |
| i |
| j |

FIG.26B
PRIOR ART

DATA IN THE FORM OF PACKET

NO CONNECTION BETWEEN RESPECTIVE DATA

| a |
|---|
| b |
| c |
| d |
| e |
| f |
| g |
| h |
| i |
| j |

WHEN TRANSFERRING DATA COMPRISING 10 CHARACTERS (SUPPOSED TO BE 10 BYTES) abcdefghij

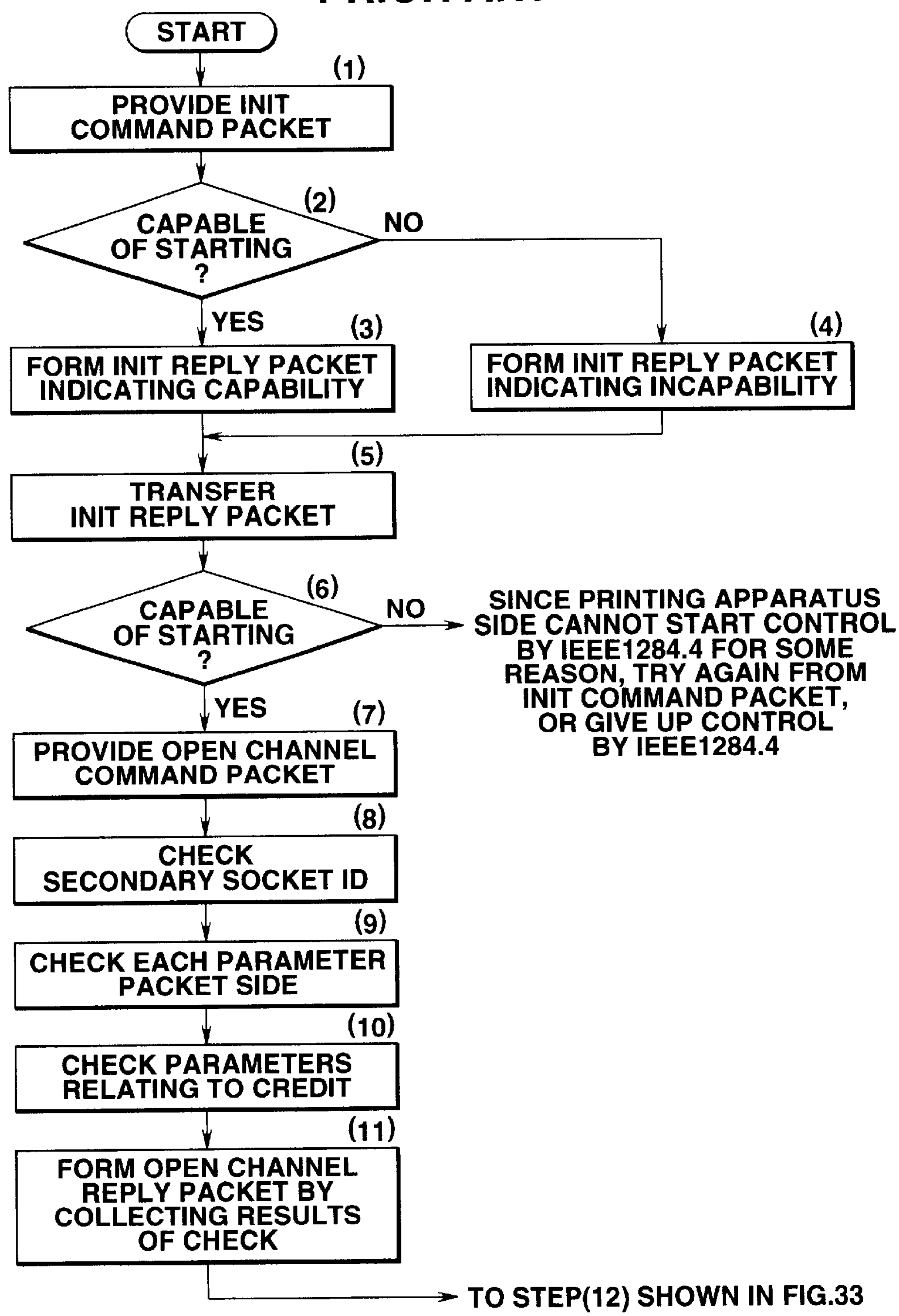
FIG.32
PRIOR ART
START
(1)
PROVIDE INIT COMMAND PACKET
(2)
CAPABLE OF STARTING ?
NO
YES
(3)
FORM INIT REPLY PACKET INDICATING CAPABILITY
(4)
FORM INIT REPLY PACKET INDICATING INCAPABILITY
(5)
TRANSFER INIT REPLY PACKET
(6)
CAPABLE OF STARTING ?
NO
SINCE PRINTING APPARATUS SIDE CANNOT START CONTROL BY IEEE1284.4 FOR SOME REASON, TRY AGAIN FROM INIT COMMAND PACKET, OR GIVE UP CONTROL BY IEEE1284.4
YES
(7)
PROVIDE OPEN CHANNEL COMMAND PACKET
(8)
CHECK SECONDARY SOCKET ID
(9)
CHECK EACH PARAMETER PACKET SIDE
(10)
CHECK PARAMETERS RELATING TO CREDIT
(11)
FORM OPEN CHANNEL REPLY PACKET BY COLLECTING RESULTS OF CHECK
TO STEP(12) SHOWN IN FIG.33

FIG.35
PRIOR ART

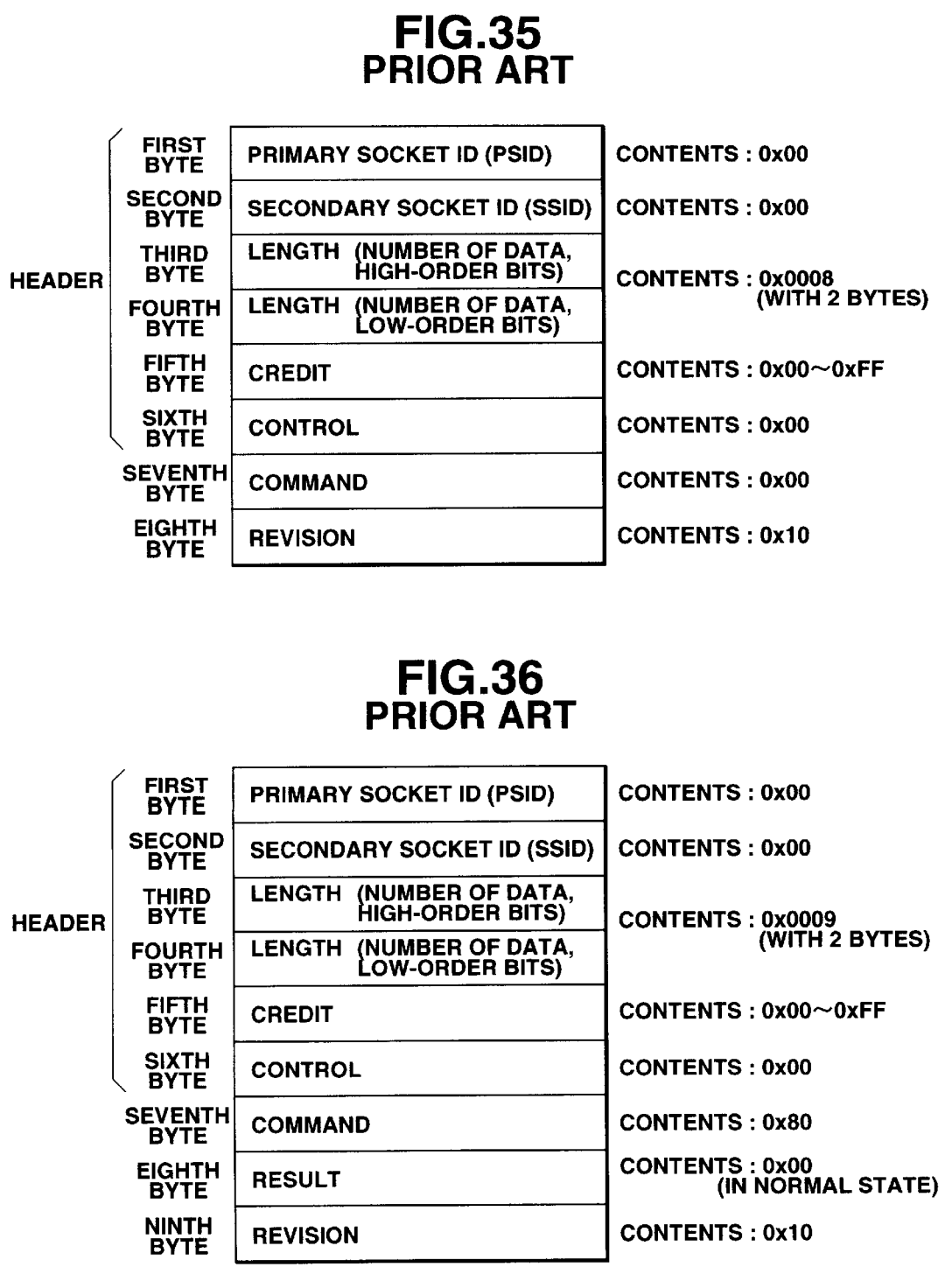

| | Byte | Field | Contents |
|---|---|---|---|
| HEADER | FIRST BYTE | PRIMARY SOCKET ID (PSID) | CONTENTS : 0x00 |
| HEADER | SECOND BYTE | SECONDARY SOCKET ID (SSID) | CONTENTS : 0x00 |
| HEADER | THIRD BYTE | LENGTH (NUMBER OF DATA, HIGH-ORDER BITS) | CONTENTS : 0x0008 (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x00 |
| | EIGHTH BYTE | REVISION | CONTENTS : 0x10 |

FIG.36
PRIOR ART

| | Byte | Field | Contents |
|---|---|---|---|
| HEADER | FIRST BYTE | PRIMARY SOCKET ID (PSID) | CONTENTS : 0x00 |
| HEADER | SECOND BYTE | SECONDARY SOCKET ID (SSID) | CONTENTS : 0x00 |
| HEADER | THIRD BYTE | LENGTH (NUMBER OF DATA, HIGH-ORDER BITS) | CONTENTS : 0x0009 (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x80 |
| | EIGHTH BYTE | RESULT | CONTENTS : 0x00 (IN NORMAL STATE) |
| | NINTH BYTE | REVISION | CONTENTS : 0x10 |

FIG.37
PRIOR ART

| | Byte | Field | Contents |
|---|---|---|---|
| HEADER | FIRST BYTE | PSID | CONTENTS : 0x00 |
| HEADER | SECOND BYTE | SSID | CONTENTS : 0x00 |
| HEADER | THIRD BYTE | LENGTH (NUMBER OF DATA, HIGH-ORDER BITS) | CONTENTS : 0x0011 (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x01 |
| | EIGHTH BYTE | PRIMARY SOCKET ID | CONTENTS : 0x01~0xFF |
| | NINTH BYTE | SECONDARY SOCKET ID | CONTENTS : 0x01~0xFF |
| | TENTH BYTE | PRIMARY TO SECONDARY PACKET SIZE HIGH-ORDER BITS | CONTENTS : 0x0000 OR 0x0006~0xFFFF |
| | ELEVENTH BYTE | PRIMARY TO SECONDARY PACKET SIZE LOW-ORDER BITS | |
| | TWELFTH BYTE | SECONDARY TO PRIMARY PACKET SIZE HIGH-ORDER BITS | CONTENTS : 0x0000 OR 0x0006~0xFFFF |
| | THIRTEENTH BYTE | SECONDARY TO PRIMARY PACKET SIZE LOW-ORDER BITS | |
| | FOURTEENTH BYTE | CREDIT REQUESTED (HIGH-ORDER BITS) | CONTENTS : 0x0000 ~0xFFFF |
| | FIFTEENTH BYTE | CREDIT REQUESTED (LOW-ORDER BITS) | |
| | SIXTEENTH BYTE | MAXIMUM OUTSTANDING CREDIT (HIGH-ORDER BITS) | CONTENTS : 0x0000 ~0xFFFF |
| | SEVENTEENTH BYTE | MAXIMUM OUTSTANDING CREDIT (LOW-ORDER BITS) | |

FIG.38
PRIOR ART

| | Byte | Field | Contents |
|---|---|---|---|
| HEADER | FIRST BYTE | PSID | CONTENTS : 0x00 |
| HEADER | SECOND BYTE | SSID | CONTENTS : 0x00 |
| HEADER | THIRD BYTE | LENGTH (NUMBER OF DATA, HIGH-ORDER BITS) | CONTENTS : 0x0010 (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x81 |
| | EIGHTH BYTE | RESULT | CONTENTS : 0x00 (IN NORMAL STATE) |
| | NINTH BYTE | PRIMARY SOCKET ID | CONTENTS : 0x01~0xFF |
| | TENTH BYTE | SECONDARY SOCKET ID | CONTENTS : 0x01~0xFF |
| | ELEVENTH BYTE | PRIMARY TO SECONDARY PACKET SIZE HIGH-ORDER BITS | CONTENTS : 0x0000 OR 0x0006~0xFFFF |
| | TWELFTH BYTE | PRIMARY TO SECONDARY PACKET SIZE LOW-ORDER BITS | |
| | THIRTEENTH BYTE | SECONDARY TO PRIMARY PACKET SIZE HIGH-ORDER BITS | CONTENTS : 0x0000 OR 0x0006~0xFFFF |
| | FOURTEENTH BYTE | SECONDARY TO PRIMARY PACKET SIZE LOW-ORDER BITS | |
| | FIFTEENTH BYTE | CREDIT (HIGH-ORDER BITS) | CONTENTS : 0x0000 ~0xFFFF |
| | SIXTEENTH BYTE | CREDIT (LOW-ORDER BITS) | |

FIG.39
PRIOR ART

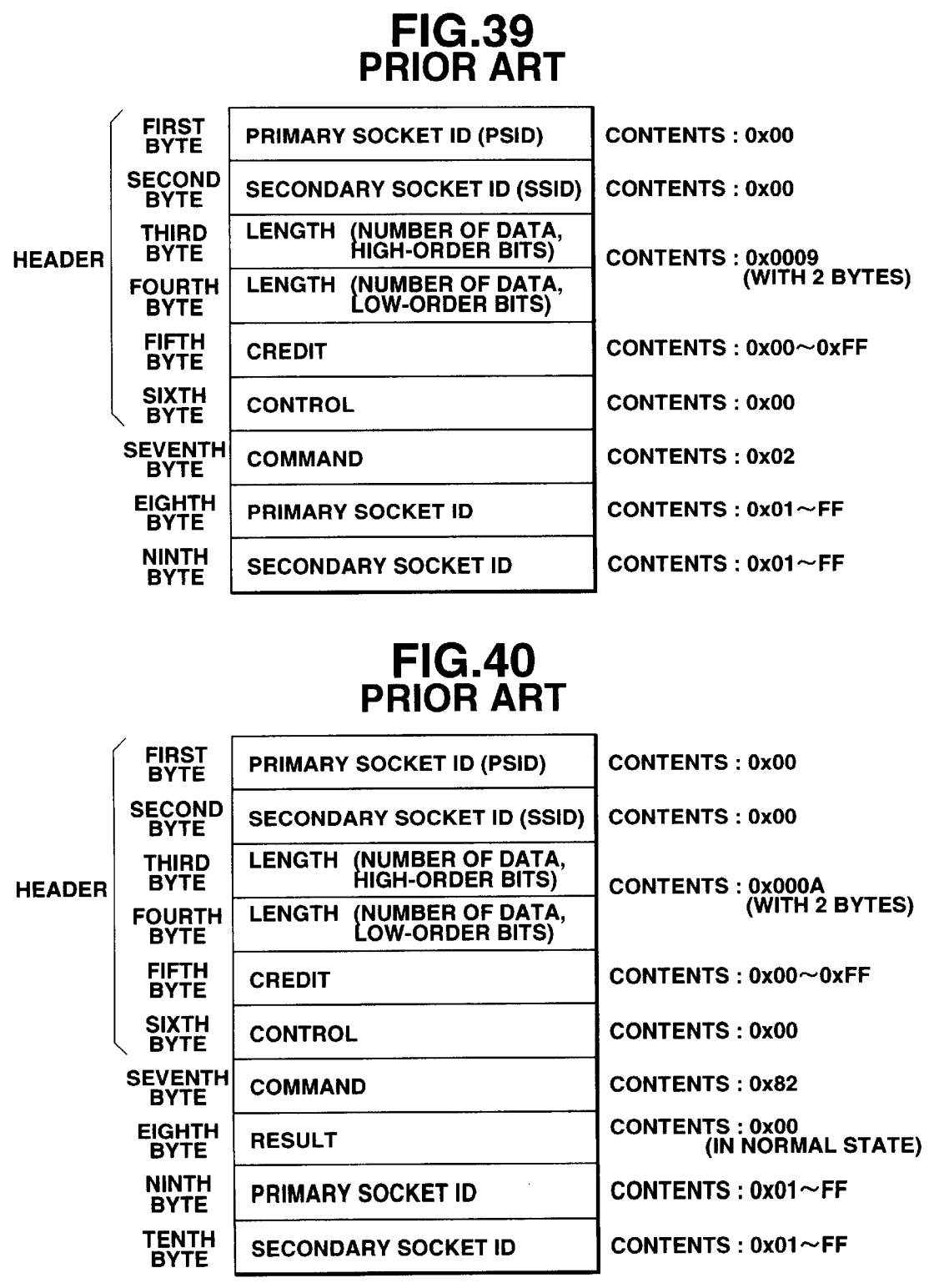

| | Byte | Field | Contents |
|---|---|---|---|
| HEADER | FIRST BYTE | PRIMARY SOCKET ID (PSID) | CONTENTS : 0x00 |
| HEADER | SECOND BYTE | SECONDARY SOCKET ID (SSID) | CONTENTS : 0x00 |
| HEADER | THIRD BYTE | LENGTH (NUMBER OF DATA, HIGH-ORDER BITS) | CONTENTS : 0x0009 (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x02 |
| | EIGHTH BYTE | PRIMARY SOCKET ID | CONTENTS : 0x01~FF |
| | NINTH BYTE | SECONDARY SOCKET ID | CONTENTS : 0x01~FF |

FIG.40
PRIOR ART

| | Byte | Field | Contents |
|---|---|---|---|
| HEADER | FIRST BYTE | PRIMARY SOCKET ID (PSID) | CONTENTS : 0x00 |
| HEADER | SECOND BYTE | SECONDARY SOCKET ID (SSID) | CONTENTS : 0x00 |
| HEADER | THIRD BYTE | LENGTH (NUMBER OF DATA, HIGH-ORDER BITS) | CONTENTS : 0x000A (WITH 2 BYTES) |
| HEADER | FOURTH BYTE | LENGTH (NUMBER OF DATA, LOW-ORDER BITS) | |
| HEADER | FIFTH BYTE | CREDIT | CONTENTS : 0x00~0xFF |
| HEADER | SIXTH BYTE | CONTROL | CONTENTS : 0x00 |
| | SEVENTH BYTE | COMMAND | CONTENTS : 0x82 |
| | EIGHTH BYTE | RESULT | CONTENTS : 0x00 (IN NORMAL STATE) |
| | NINTH BYTE | PRIMARY SOCKET ID | CONTENTS : 0x01~FF |
| | TENTH BYTE | SECONDARY SOCKET ID | CONTENTS : 0x01~FF |

FIG.41
PRIOR ART

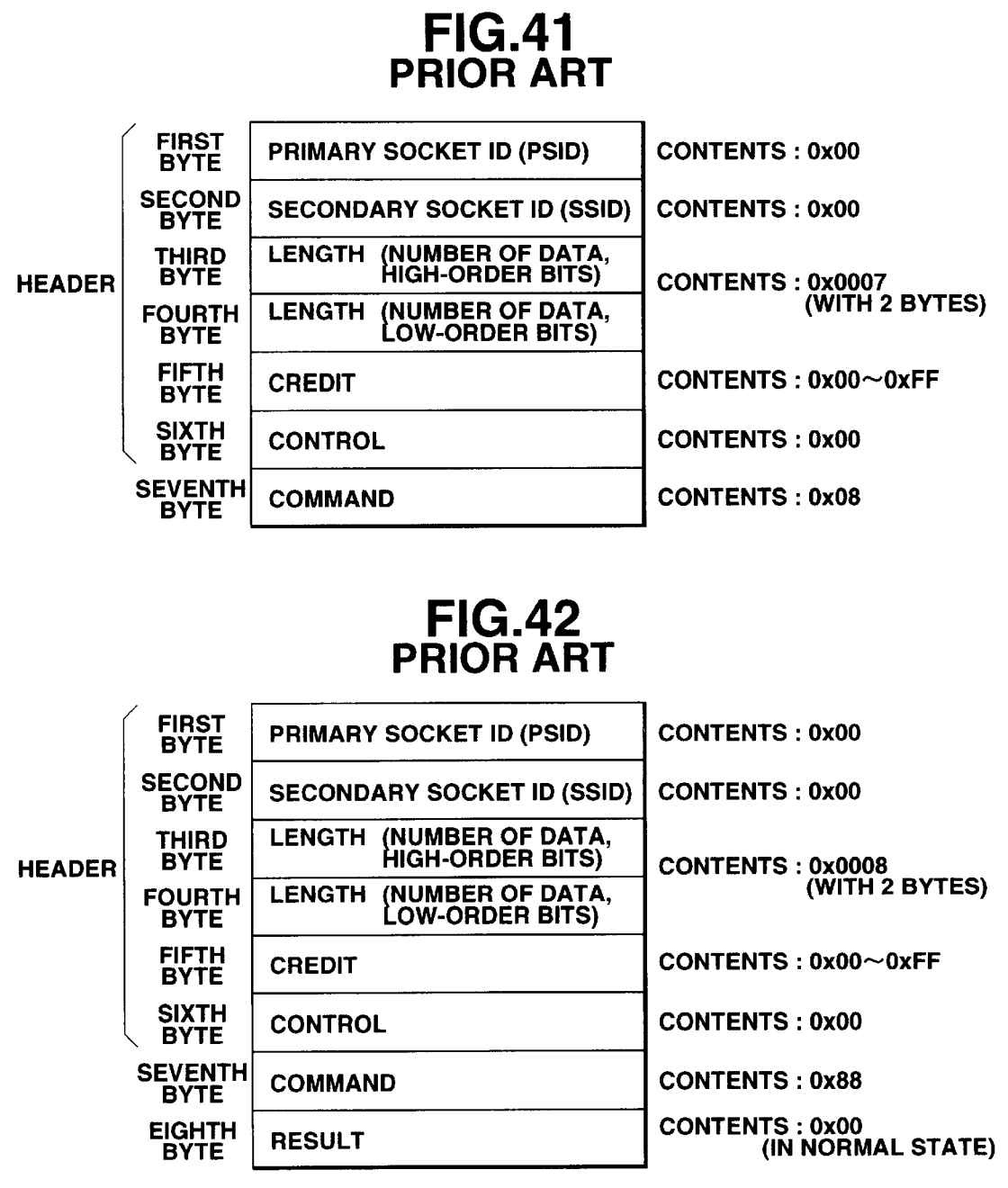

| | | Field | Contents |
|---|---|---|---|
| HEADER | FIRST BYTE | PRIMARY SOCKET ID (PSID) | CONTENTS : 0x00 |
| | SECOND BYTE | SECONDARY SOCKET ID (SSID) | CONTENTS : 0x00 |
| | THIRD BYTE | LENGTH (NUMBER OF DATA, HIGH-ORDER BITS) | CONTENTS : 0x0007 (WITH 2 BYTES) |
| | FOURTH BYTE | LENGTH (NUMBER OF DATA, LOW-ORDER BITS) | |
| | FIFTH BYTE | CREDIT | CONTENTS : 0x00~0xFF |
| | SIXTH BYTE | CONTROL | CONTENTS : 0x00 |
| | SEVENTH BYTE | COMMAND | CONTENTS : 0x08 |

FIG.42
PRIOR ART

| | | Field | Contents |
|---|---|---|---|
| HEADER | FIRST BYTE | PRIMARY SOCKET ID (PSID) | CONTENTS : 0x00 |
| | SECOND BYTE | SECONDARY SOCKET ID (SSID) | CONTENTS : 0x00 |
| | THIRD BYTE | LENGTH (NUMBER OF DATA, HIGH-ORDER BITS) | CONTENTS : 0x0008 (WITH 2 BYTES) |
| | FOURTH BYTE | LENGTH (NUMBER OF DATA, LOW-ORDER BITS) | |
| | FIFTH BYTE | CREDIT | CONTENTS : 0x00~0xFF |
| | SIXTH BYTE | CONTROL | CONTENTS : 0x00 |
| | SEVENTH BYTE | COMMAND | CONTENTS : 0x88 |
| | EIGHTH BYTE | RESULT | CONTENTS : 0x00 (IN NORMAL STATE) |

FIG.43
PRIOR ART

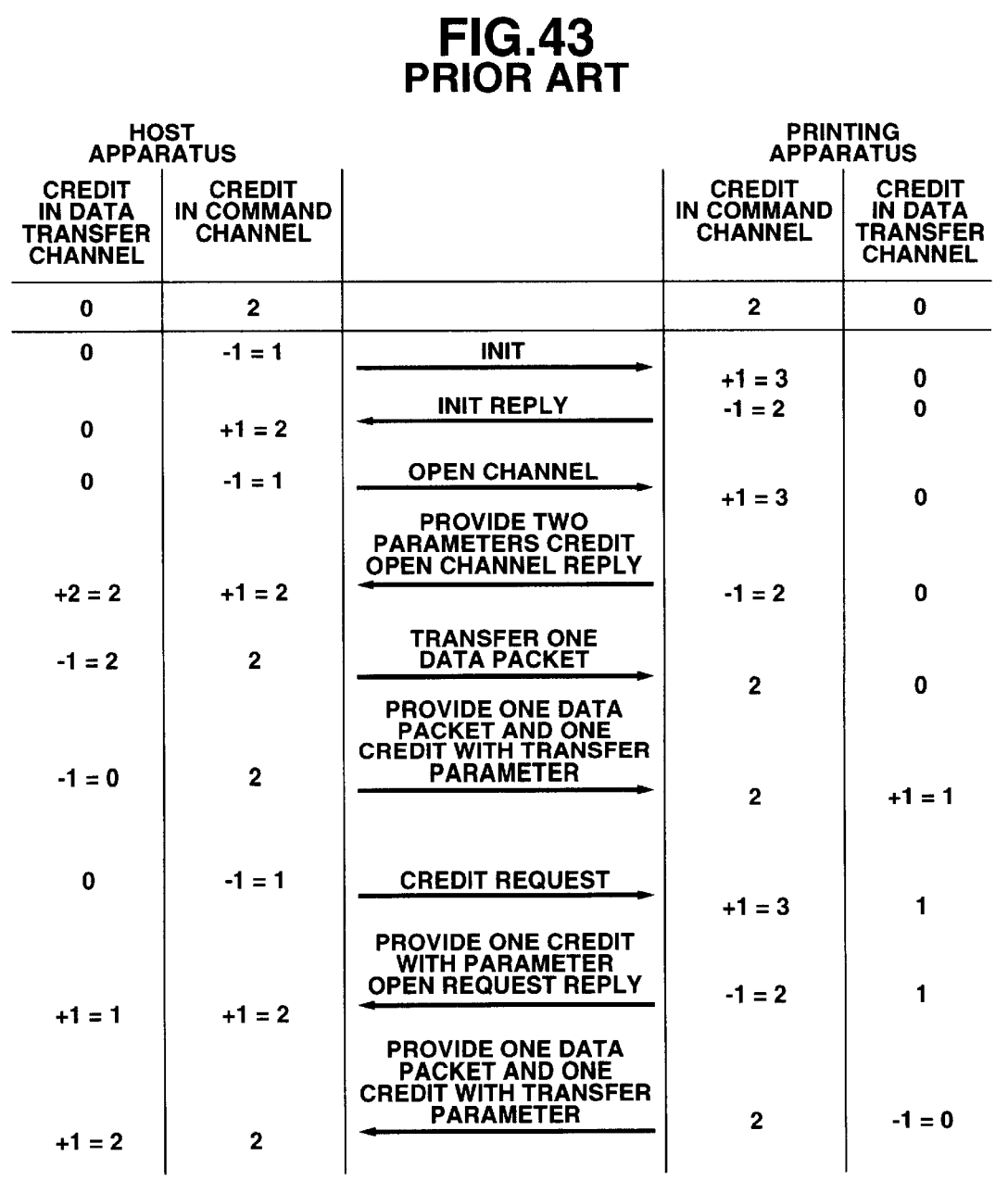

| HOST APPARATUS | | | PRINTING APPARATUS | |
|---|---|---|---|---|
| CREDIT IN DATA TRANSFER CHANNEL | CREDIT IN COMMAND CHANNEL | | CREDIT IN COMMAND CHANNEL | CREDIT IN DATA TRANSFER CHANNEL |
| 0 | 2 | | 2 | 0 |
| 0 | -1 = 1 | INIT → | +1 = 3 | 0 |
| 0 | +1 = 2 | ← INIT REPLY | -1 = 2 | 0 |
| 0 | -1 = 1 | OPEN CHANNEL → | +1 = 3 | 0 |
| +2 = 2 | +1 = 2 | ← PROVIDE TWO PARAMETERS CREDIT OPEN CHANNEL REPLY | -1 = 2 | 0 |
| -1 = 2 | 2 | TRANSFER ONE DATA PACKET → | 2 | 0 |
| -1 = 0 | 2 | PROVIDE ONE DATA PACKET AND ONE CREDIT WITH TRANSFER PARAMETER → | 2 | +1 = 1 |
| 0 | -1 = 1 | CREDIT REQUEST → | +1 = 3 | 1 |
| +1 = 1 | +1 = 2 | ← PROVIDE ONE CREDIT WITH PARAMETER OPEN REQUEST REPLY | -1 = 2 | 1 |
| +1 = 2 | 2 | ← PROVIDE ONE DATA PACKET AND ONE CREDIT WITH TRANSFER PARAMETER | 2 | -1 = 0 |

FIG.44
PRIOR ART

| | Byte | Field | Contents |
|---|---|---|---|
| HEADER | FIRST BYTE | PSID | CONTENTS : 0x00 |
| | SECOND BYTE | SSID | CONTENTS : 0x00 |
| | THIRD BYTE | LENGTH (NUMBER OF DATA, HIGH-ORDER BITS) | CONTENTS : 0x000D (WITH 2 BYTES) |
| | FOURTH BYTE | LENGTH (NUMBER OF DATA, LOW-ORDER BITS) | |
| | FIFTH BYTE | CREDIT | CONTENTS : 0x00~0xFF |
| | SIXTH BYTE | CONTROL | CONTENTS : 0x00 |
| | SEVENTH BYTE | COMMAND | CONTENTS : 0x04 |
| | EIGHTH BYTE | PRIMARY SOCKET ID | CONTENTS : 0x01~0xFF |
| | NINTH BYTE | SECONDARY SOCKET ID | CONTENTS : 0x01~0xFF |
| | TENTH BYTE | CREDIT REQUESTED (HIGH-ORDER BITS) | CONTENTS : 0x0000 ~0xFFFF |
| | ELEVENTH BYTE | CREDIT REQUESTED (LOW-ORDER BITS) | |
| | TWELFTH BYTE | MAXIMUM OUTSTANDING CREDIT (HIGH-ORDER BITS) | CONTENTS : 0x0000 ~0xFFFF |
| | THIRTEENTH BYTE | MAXIMUM OUTSTANDING CREDIT (LOW-ORDER BITS) | |

FIG.45
PRIOR ART

| | Byte | Field | Contents |
|---|---|---|---|
| HEADER | FIRST BYTE | PSID | CONTENTS : 0x00 |
| | SECOND BYTE | SSID | CONTENTS : 0x00 |
| | THIRD BYTE | LENGTH (NUMBER OF DATA, HIGH-ORDER BITS) | CONTENTS : 0x000C (WITH 2 BYTES) |
| | FOURTH BYTE | LENGTH (NUMBER OF DATA, LOW-ORDER BITS) | |
| | FIFTH BYTE | CREDIT | CONTENTS : 0x00~0xFF |
| | SIXTH BYTE | CONTROL | CONTENTS : 0x00 |
| | SEVENTH BYTE | COMMAND | CONTENTS : 0x84 |
| | EIGHTH BYTE | RESULT | CONTENTS : 0x00 (IN NORMAL STATE) |
| | NINTH BYTE | PRIMARY SOCKET ID | CONTENTS : 0x01~0xFF |
| | TENTH BYTE | SECONDARY SOCKET ID | CONTENTS : 0x01~0xFF |
| | ELEVENTH BYTE | CREDIT (HIGH-ORDER BITS) | CONTENTS : 0x0000 ~0xFFFF |
| | TWELFTH BYTE | CREDIT (LOW-ORDER BITS) | |

INTERFACE CONTROL APPARATUS

BACKGROUND OF THE INVENTION

1. Field of the Invention

The present invention relates to a communication control apparatus for performing two-way communication processing with a data processing apparatus via a predetermined interface, a method for processing data of the communication control apparatus, and a storage medium storing programs capable of being read by a computer.

2. Description of the Related Art

Conventionally, data communication between a host apparatus and an image input/output apparatus, such as a printer, a scanner or the like, is executed via a predetermined interface. A Centronics interface, serving as an interface of this type, is a main interface for transferring data from a host computer to a printer, and has the feature that inexpensive high-speed data transfer can be performed with standards for transmitting data from a computer to a printer which have been developed by Centronics Corporation of U.S.A. for its own printers. Although the Centronics interface is widely used as means for transmitting data from a personal computer (PC) to a printer, it is not standardized.

Although the Centronics interface has many variations depending on each combination of a host computer and a printer, the variations are basically similar. Basic controls are performed using three signal lines, i.e., DATA STROBE, ACK and BUSY. A transfer method using these three signal lines is called a compatibility mode in contrast to a nibble mode, a byte mode, an ECP (extended capabilities port) mode and the like (to be described later).

The compatibility mode will now be described in detail with reference to drawings. It is impossible to describe all of many variations which exist in the compatibility mode as described above. Hence, a description will be provided illustrating a laser-beam printer made by Canon Inc.

FIG. 22 is a plan view illustrating the pin arrangement of a printer interface in a printing system to which a communication control apparatus of this type can be applied. In FIG. 22, 36 pins are arranged.

Numerals in FIG. 22 represent the numbers of respective pins, each of which corresponds to one signal line. In FIG. 22, a pin 1 is a signal line for DATA STROBE, and usually assumes a “High” state. When the state shifts to a “Low” state, a printer reads the states of pins 2–9 for data lines DATA1–DATA8, respectively.

The data lines DATA1–DATA8 represent information for the 0th–7th bits, respectively, of data transmitted from a host apparatus. On each of these data lines, data is “1” and “0” in the “High” and “Low” states, respectively. In a stationary state, data is indefinite. Data is effective only when the DATA STROBE line assumes the “Low” state.

A pin 10 is for an acknowledge line ACK, and assumes the “High” state in a stationary state. A pulse for providing the “Low” state is generated when the state shifts from the stationary state.

A pin 11 is for a busy line BUSY, on which a state signal indicating whether or not the printer can receive data from the host apparatus is provided. On this line, the “Low” state represents a state in which a signal can be received, and the “High” state represents a state in which a signal cannot be received.

A pin 12 is for a printer error line PE, which assumes the “High” state when an error is generated in the printer, and assumes the “Low” state in other states. A pin 13 is for a select line SELECT, which assumes the “High” state when the printer is in an on-line state, and assumes the “Low” state in other states. A pin 14 is for a signal line AUTO FD, which is unused.

A pin 15 is for a signal line AUXOUT1, which always assumes the “High” state. The ground level of the printer is applied to a pin 16. A pin 17 is for a frame ground line Frame GND, which corresponds to the frame ground of the printer.

A voltage of +5 V is applied to a pin 18, which always assumes the “High” state. Pins 19–30 are connected to the ground. A pin 31 is for an input prime line INIT, which always assumes the “High” state. By making the input prime line INIT to the “Low” state, input prime processing is performed.

A pin 32 is for a signal line FAULT, which assumes the “High” state when the printer is in an on-line state, and assumes the “Low” state in other states. A pin 33 is for a signal line AUXOUT2, which always assumes the “Low” state. A pin 34 is for a signal line AUXOUT3, which always assumes the “Low” state. A pin 35 is for a signal line AUXOUT4, which always assumes the “High” state. A pin 36 is for a signal line SELECTIN, which is unused.

In the compatibility mode, the pins 1–11 for DATA STROBE, DATA1, DATA2, DATA3, DATA4, DATA5, DATA6, DATA7, DATA8, ACK and BUSY, respectively, are mainly used. FIG. 23 illustrates handshaking in the compatibility mode.

FIG. 23 illustrates a timing chart for explaining the state of data transfer processing in the printing system. The timing chart shown in FIG. 23 corresponds to handshaking in the compatibility mode. In this case, 1-byte data is transmitted.

The compatibility mode can only perform data transfer in one direction from the host apparatus to the printer, and cannot perform data transfer from the printer to the host apparatus.

In order to solve this problem, two-way Centronics communication handshaking is standardized by the IEEE (Institute of Electrical and Electronics Engineers) as a superior alternative of the compatibility mode (IEEE 1284-1994).

In the IEEE 1284-1994, a plurality of communication modes, such as the nibble mode, the byte mode, the ECP mode and the like, are newly provided in addition to the above-described compatibility mode (the conventional handshaking for transferring data from a host apparatus to a printer).

Connectors and cables having the same shape as in the compatibility mode can be used in all of the newly added modes. The nibble mode is for transferring data from a printer to a host apparatus. By alternately using the nibble mode and the compatibility mode, two-way communication between a host apparatus and a printer can be realized.

That is, by performing transmission from a host apparatus to a printer in the compatibility mode and performing transmission from the printer to the host apparatus in the nibble mode, two-way communication can be realized.

In the nibble mode, control is performed using the acknowledge signal line ACK and the signal line AUTO FD, and data is set on the four signal lines, i.e., BUSY, PE, SELECT and FAULT.

8-bit (1-byte) transfer is realized by dividing 1 byte of data into two 4-bit portions, and first transmitting lower-order 4 bits followed by transmission of higher-order 4 bits. The signal line FAULT is also used for indicating by the printer whether or not data to be transmitted to the host apparatus is ready at a specific timing. Handshaking is performed without using the signal lines DATA1, DATA2, . . . , DATA8 which are controlled only by the host apparatus in the compatibility mode. These signal lines DATA1, DATA2, . . . , DATA8 are called data buses. Since the data buses are not used in the nibble mode, the host apparatus side need not provide hardware for dealing with data transmitted through the data buses. Hence, mounting can be relatively easily realized.

The byte mode is also for performing communication from a printer to a host apparatus, as the nibble mode. By alternately using the compatibility mode and the byte mode, two-way communication between the host apparatus and the printer can be realized.

That is, by performing transmission from the host apparatus to the printer in the compatibility mode, and performing transmission from the printer to the host apparatus in the byte mode, two-way communication can be realized. In the byte mode, control is performed using the signal lines STROBE, ACK, BUSY, PE, AUTO FD and FAULT, and data is set on the data buses (the signal lines DATA1, DATA2, . . . , DATA 8). This mode is more efficient than the nibble mode because 1-byte (8-bit) data is simultaneously transmitted. However, since the data buses are controlled by the printer side, the host apparatus side must provide hardware for dealing with transmitted data.

The ECP mode is for performing two-way communication between a host apparatus and a printer, and vice versa. By performing switching between Forward Phase (from the host apparatus to the printer) and Reverse Phase (from the printer to the host apparatus), two-way data communication can be realized in the same ECP mode.

In the ECP mode, control is performed using the signal lines STROBE, ACK, BUSY, AUTO FD, INIT, FAULT and PE, and data is set on the data buses.

In this case, since the data buses are also controlled by the printer side, the host apparatus side must provide hardware for dealing with transmitted data. The ECP mode has the features that overhead for shifting between the modes is small, and a higher transfer speed can be provided in handshaking for transfer in the Forward Phase than in handshaking in the compatibility mode. The outline of the IEEE 1284 has been described.

Data transmitted from the host apparatus to the printer via the Centronics interface is interpreted only by an interpretation portion of the printer side, and the printer performs printing processing in accordance with the result of interpretation. During transmission of a series of data, it is impossible to transmit other data, control commands and the like until the transmission of the series of data is completed.

That is, since a command for asking the state of the printer cannot be transmitted to the printer until the transmission of a series of data is completed even if the host apparatus side intends to know the state of the printer during the transmission, the host apparatus side cannot know the state of the printer.

In order to solve such a problem which will occur when using an I/F (interface) having only a single data path as the Centronics interface, it is now intended to standardize packet protocols.

For example, IEEE 1284.4 is one of packet protocol standards. The IEEE 1284.4 assumes various serial or parallel I/Fs, such as RS232C, USB (Universal Serial Bus), IEEE1394 and the like, in addition to the IEEE 1284.4 as physical I/Fs. An outline of the IEEE 1284.4 will be described later.

The packet protocol is a protocol in which, for example, a series of data is divided into a plurality of blocks, and the data is provided in the form of a packet by adding a header indicating packet information, such as the data size, channel IDs and the like, to the head of each block, so as to logically realize a plurality of channels and allow independent information exchange without causing interference between the channels.

By using such a packet protocol, it is logically possible to exchange a plurality of independent information (data, control commands and the like) in parallel on different channels. For example, it is possible to transmit a command asking the state of the printer during transmission of a series of data without awaiting the completion of the transmission.

By preparing a reception buffer storage for each channel, even if the reception buffer storage in a certain channel is fully occupied, other channels can be used without being influenced by that channel.

For example, when it is intended to transmit 20-Kbyte (kilobyte, hereinafter abbreviated as "KB" (1 KB=1024 bytes)) data as printing data and 100-byte (hereinafter abbreviated as "B") data as a control command, a protocol other than a packet protocol can select only one of two methods, i.e., a method of first completing the transmission of the 20-KB printing data followed by the transmission of the 100-B control command, and a method of first completing the transmission of the 100-B control command followed by the transmission of the 20-KB printing data.

To the contrary, in a packet protocol, it is possible to transmit a control command during transmission of printing data. For example, the 20-KB printing data is divided into 10 blocks, and the 100-B control command is transmitted after completing transmission of a 2-KB block and before transmitting the next 2-KB block. Hence, a packet protocol is useful, for example, in real-time control of a printer by a host apparatus.

An outline of the IEEE 1284.4, an example of division of data into packets, and an example of transmission of printing data and a control command will now be described.

It can be said that the IEEE 1284.4 mainly provides two features, i.e., flow control between two apparatuses (for example, a host apparatus and a printing apparatus) utilizing a concept of credit and using data transfer conforming to the above-described IEEE 1284 standards (or any other appropriate interface), and multiplexing (provision of multichannels) for simultaneously exchanging a plurality of information (for example, data and control information).

In internal processing in the host apparatus and the printing apparatus, control by the IEEE 1284.4 is performed in an intermediate portion between processing of performing printing using transferred data (generally called "application") and the IEEE 1284, serving as actual data transfer portion. FIG. 24 illustrates the concept of such relationship.

FIG. 24 is a diagram illustrating the concept of relationship between each communication control program and application in the printing system.

As shown in FIG. 24, a control program according to the IEEE 1284.4 is present between the host apparatus and the printing apparatus which can communicate with each other via an interface cable, so as to perform communication between application and a control program according to the IEEE 1284.

Next, the configuration of data dealt with in the IEEE 1284.4 will be described. Data dealt with in the IEEE 1284.4 is always formed in units of a group comprising some bytes, which is called a packet. The configuration of the packet is defined as shown in FIG. 25.

FIG. 25 is a diagram illustrating the configuration of a communication packet utilized in a communication interface of the printing system.

In FIG. 25, the communication packet is configured by a header portion H comprising 6 bytes, and data Data provided thereafter.

The header portion H will now be described in more detail.

The first byte represents Primary Socket ID (hereinafter abbreviated as "PSID"), which represents Socket ID of an apparatus where initialization of control according to the IEEE 1284.4 (to be described later) is started. The Socket ID will be described later.

The second byte represents Secondary Socket ID (hereinafter abbreviated as "SSID"), which represents Socket ID of another apparatus with respect to the above-described apparatus.

The third and fourth bytes represent the size of the entire packet inclusive of the 6-byte header. For example, in the case of a packet including 10-byte data, a value 16 (6 bytes for the header and 10 bytes for the data) is recorded in this portion. FIGS. 26A and 26B illustrate data which is provided in the form of a packet, and data which is not provided in the form of a packet, respectively.

FIGS. 26A and 26B are diagrams, each illustrating communication data exchanged through a communication interface of the printing system: FIG. 26A illustrates data which is provided in the form of a packet; and FIG. 26B illustrates data which is not provided in the form of a packet.

In the case of FIG. 25, for a packet having 0-byte data, a value 6 which represents 6 bytes for only the header portion is recorded in the portion of the third and fourth bytes.

Actually, however, since each data is represented by hexadecimal notation, the above-described 16 and 6 are represented by 0x0010 and 0x0006, respectively (in the case of hexadecimal notation, the notation generally starts with "0x", and 1 byte is represented by two digits).

The fifth byte represents Credit (to be described later). The sixth byte represents control data described as Control. One bit in this byte (one byte comprises eight bits) represents whether or not the packet is an ordinary packet (which is represented by "0"). Since the packet is an ordinary packet in most cases, the bit is 0. The remaining seven bits are used as a reserved region which is not used at present (represented by 0).

Accordingly, this byte is usually represented by "0x00". The data portion includes transfer data formed by application of each of the host apparatus and the printing apparatus (printing data and control data), or a control command in the IEEE 1284.4 (to be described later).

Next, the Socket ID shown in FIG. 25 will be described.

When a plurality of processing (mainly the processing of the application portion) in two apparatuses connected by a single interface (for example, an IEEE 1284 interface) identify respective partners thereof (processing in another apparatus) and exchange data independently, an individual number provided for each processing within each apparatus for executing the data exchange is represented by Socket ID. An outline of the Socket ID will now be described.

For example, when two types of processing (processing A and processing B) are present in the application of the host apparatus, and two types of processing (processing "a" for the processing A and processing "b" for the processing B) are present in the application of the printing apparatus, it is assumed that the PSIDs for the processing A and the processing B are 0x10 and 0x20, and the SSIDs for the processing "a" and the processing "b" are 0x10 and 0x20, respectively. By making the PSID and the SSID of the packet 0x10 and 0x10, respectively, when the processing A transmits data "A" and "I", and making the PSID and the SSID of the packet 0x20 and 0x20, respectively, when the processing B transmits data "KA" and "KI", according to the control of the IEEE 1284.4, it is possible to recognize from which processing to which processing the transmitted packet is transferred, and therefore to assuredly transfer the data to corresponding processing. Hence, it can be said that a plurality of channels have been logically used so as to realize a multichannel operation.

FIGS. 27–31 are diagrams illustrating the concept of a multichannel operation in a communication interface in the printing system, and sequentially illustrate a manner in which data are independently transferred from a plurality of (two in this case) application of the host apparatus to a plurality (two in this case) of corresponding application in the printing apparatus via respective processing.

Particularly, in FIG. 27, two types of processing (the processing A and the processing B) are present in the application of the host apparatus, and each processing has data to be transferred ("A" and "I" for the processing A, and "KA" and "KI" for the processing B).

FIG. 28 illustrates a manner in which packets are formed in the IEEE 1284.4 processing in the host apparatus, and the above-described Socket IDs are provided for each of the packets. The procedure for transferring the packets will be described later.

FIG. 29 illustrates a manner in which each data in the form of a packet is transferred from the host apparatus to the printing apparatus via the processing of the interface (IEEE 1284 processing). As shown in FIG. 29, the order of transfer of the packets is not particularly defined. In the case of FIG. 29, four packets are transferred in the order of the first packet of the processing A (the packet having the data "A"), the first packet of the processing B (the packet having the data "KA"), the second packet of the processing A (the packet having the data "I"), and the second packet of the processing B (the packet having the data "KI").

FIG. 30 illustrates a manner in which the packets transferred to the printing apparatus are received by the IEEE 1284.4 at the printing apparatus side, and data extracted from each packet is transferred to corresponding application in accordance with the Socket IDs. As a result, as shown in FIG. 31, each data is transferred to the processing of corresponding application (the processing "a" and the processing "b") within the printing apparatus. A similar operation is, of course, performed for transfer in a direction reverse to the above-described case (from the processing in the printing apparatus to the processing in the host apparatus).

When Socket IDs are represented by 0x00 (i.e., both PSID and SSID are represented by 0x00), only Command and Reply Packet (to be described later) necessary for executing the IEEE 1284.4 processing are transferred.

Next, the procedure (the flow of processing) of basic control in the IEEE 1284.4 will be described with reference to the flowcharts shown in FIGS. 32–34, and examples of packets shown in FIGS. 35 and 36.

FIGS. 32–34 are flowcharts illustrating a data communication processing procedure in the printing system. In FIGS. 32–34, numerals (1)–(24) represent respective steps.

First, an apparatus intending to start control according to the IEEE 1284.4 provides another apparatus with an initial command packet Init Command Packet (step (1)) (since a host apparatus usually provides a printing apparatus with such a packet, the apparatus which has provided the packet Init Command Packet is called the host apparatus, and another apparatus is called the printing apparatus).

The structure of the packet Init Command Packet will now be described with reference to FIG. 35.

FIG. 35 is a diagram illustrating the data structure of an initial command packet notified from the upper apparatus to the apparatus of the communication partner (the printing apparatus) in the printing system. The packet Init Command Packet includes the first through eighth bytes, and a header portion includes the first through sixth bytes.

In FIG. 35, data in portions other than a portion Credit in the fifth byte are substantially fixed data.

The printing apparatus which has received the packet Init Command Packet determines if control according to the IEEE 1284.4 can be started (step (2)). If the result of the determination in step (2) is affirmative, a reply packet Init Reply Packet indicating the possibility of starting the control is formed (step (3)). If the result of the determination in step (2) is negative, a reply packet Init Reply Packet indicating the incapability of starting the control is formed (step (4)), and the process proceeds to step (5). At that time, if control according to the IEEE 1284.4 can be started, initialization for the start is also executed.

In step (5), the initial reply packet Init Reply Packet is transferred to the host apparatus. The data structure of the packet Init Reply Packet will now be briefly described with reference to FIG. 36.

FIG. 36 is a diagram illustrating the data structure of a reply packet notified from the printing apparatus to the host apparatus requesting communication in the printing system. The packet Init Reply Packet includes the first through ninth bytes, and a header portion includes the first through sixth bytes.

In FIG. 36, the eighth byte represents data Result. The reply packet Init Reply Packet notifies the host apparatus whether processing according to the IEEE 1284.4 can be normally started or the processing cannot be started because of some reason.

Then, the host apparatus determines if the processing according to the IEEE 1284.4 can be started, i.e., if data processing is to be normally continued, in accordance with the notified packet Init Reply Packet (step (6)). If the result of the determination in step (6) is affirmative, the host apparatus then provides the printer with a command packet Open Channel Command Packet having a data structure as shown in FIG. 37.

If the result of the determination in step (6) is negative, the packet Init Command Packet is again transferred to the printing apparatus, or control according to the IEEE 1284.4 is given up.

The data structure of the packet Open Channel Command Packet will now be briefly described with reference to FIG. 37.

FIG. 37 is a diagram illustrating the data structure of a packet Open Channel Command Packet notified from the host apparatus to the printing apparatus in the printing system. The packet Open Channel Command Packet includes the first through seventeenth bytes, and a header portion includes the first through sixth bytes.

In FIG. 37, the ninth byte represents a parameter, which corresponds to Secondary Socket ID. The tenth and eleventh bytes also represent a parameter Primary To Secondary Packet Size indicating the maximum size of a packet transferred from the host apparatus to the printing apparatus according to a request of the host apparatus. The twelfth and thirteenth bytes represent a parameter Secondary To Primary Packet Size indicating the maximum size of a packet transferred from the printing apparatus to the host apparatus according to a request of the host apparatus.

The fourteenth and fifteenth bytes represent a parameter which corresponds to information Credit Requested requested by the host apparatus. The sixteenth and seventeenth bytes represent a parameter which corresponds to information Maximum Outstanding Credit.

When the printing apparatus has received the packet Open Channel Command Packet, the printing apparatus confirms if the value of the parameter Secondary Socket ID in the received packet equals the value of the SSID possessed by the printing apparatus (step (8)). If the received SSID is confirmed to be the SSID possessed by the printing apparatus, the channel is established (opened).

It is possible to identify the opened channel based on the combination of Socket IDs (PSID and SSID). That is, as described above with respect to the Socket IDs, the channel connecting the processing A of the application in the host apparatus to the processing "a" of the application in the printing apparatus can be identified based on the combination of the Socket IDs (PSID=0X10 and SSID=0x10). Similarly, the channel connecting the processing B of the application in the host apparatus to the processing "b" of the application in the printing apparatus can be identified based on the combination of the Socket IDs (PSID=0X20 and SSID=0x20).

Then, the parameter Primary To Secondary Packet Size indicating the maximum size of the packet when transferring data from the host apparatus to the printing apparatus according to a request of the host apparatus, and the parameter Secondary To Primary Packet Size indicating the maximum size of the packet when transferring data from the printing apparatus to the host apparatus according to a request of the host apparatus are checked, in order to determine if the checked size is a packet size which can be prepared by the corresponding apparatus (step (9)). If the result of the determination in step (9) is affirmative, a parameter indicating the fact is set in a packet Open Channel Reply Packet (to be described later). If the result of the determination in step (9) is negative, the packet sizes (Primary To Secondary Packet Size and Secondary To Primary Packet Size) which can be prepared by the respective apparatuses are set as the parameters.

Then, a parameter Credit Requested and a parameter Maximum Outstanding Credit representing information Credit requested by the host apparatus are analyzed (step (10)), and a reply for a request represented by the combination of the two parameters is performed using a parameter Open Channel Reply as in the above-described case of the packet size.

When the analysis of respective parameters Open Channel Command has been completed in the above-described manner, the printing apparatus forms a packet Open Channel Reply Packet shown in FIG. 38 (step (11)) and transfers the formed packet to the host apparatus (step (12)).

FIG. 38 is a diagram illustrating the data structure of the packet Open Channel Reply Packet notified from the printing apparatus to the host apparatus in the printing system. The packet Open Channel Reply Packet includes the first through sixteenth bytes, and a header portion includes the first through sixth bytes.

In FIG. 38, the eleventh and twelfth bytes represent a parameter Primary To Secondary Packet Size indicating the maximum size of the packet transferred from the host apparatus to the printing apparatus according to a request of the host apparatus.

The thirteenth and fourteenth bytes represent a parameter Secondary To Primary Packet Size indicating the maximum size of the packet transferred from the printing apparatus to the host apparatus according to a request of the host apparatus.

Then, the host apparatus determines if the channel has been opened by analyzing the parameter Open Channel Reply Packet (step (13)). If the result of the determination in step (13) is affirmative, the data packet having the data structure shown in FIG. 25 can be transferred to the opened channel (step (14)).

The size of the data packet to be transferred is determined by comparing the packet size requested by the user (the host apparatus which has provided the packet Open Channel Command Packet) with the packet size requested by the printing apparatus side and indicated by the reply Open Channel Reply, and adopting the smaller packet size.

The transfer of the data packet in the reverse direction (i.e., from the printing apparatus to the host apparatus) may, of course, be performed, and the transfer of the packet Command Packet relating to Credit (to be described later) becomes effective in this case (the transfer may, of course, be performed before opening the channel, though such transfer is meaningless).

Any number of channels may be opened provided that processing can be performed within the apparatus (and combination of Socket IDs does not overlap), by repeating the return to step (7). In the above-described example of Socket IDs, two channels, i.e., the channel connecting the processing A of the host apparatus to the processing "a" of the printing apparatus, and the channel connecting the processing B to the processing "b", are opened.

The flow until the channel connecting the processing of application within the host apparatus to the processing of application within the printing apparatus is opened has been described. Since a channel for transferring various commands Command and replies Reply (Init. Open Channel and the like) (hereinafter termed a "command channel") has been implicitly opened, the above-described procedure is unnecessary.

As has been described, the Socket ID for identifying the channel is "0x00". It is possible to terminate (close) a channel where data exchange has been terminated (which is to be terminated) by a packet Close Channel Command Packet.

When the host apparatus intends to close a channel, a packet Close Channel Command Packet having the data structure shown in FIG. 39 is transferred to the printing apparatus (step (15)).

FIG. 39 is a diagram illustrating the data structure of a packet Close Channel Command Packet notified from the host apparatus to the printing apparatus in the printing system. The packet Close Channel Command Packet includes the first through ninth bytes, and a header portion includes the first through sixth bytes.

In FIG. 39, the eighth and ninth bytes represent a parameter which is obtained by combining Primary Socket ID and Secondary Socket ID for indicating the channel to be closed.

The printing apparatus analyzes the parameter (step (16)), and determines if the channel assigned to be closed is closable (opened) (step (17)). If the result of the determination in step (16) is affirmative, the printing apparatus closes the channel, and prepares a reply for notifying the host apparatus of the fact using a packet Close Channel Reply Packet (step (18)).

If the result of the determination in step (17) is negative, a packet Reply Packet is formed (step (19)).

After thus forming the packet Close Channel Reply Packet, the printing apparatus transfers the formed packet Close Channel Reply Packet having the data structure shown in FIG. 40 to the host apparatus (step (20)).

FIG. 40 is a diagram illustrating the data structure of the packet Close Channel Reply Packet notified from the printing apparatus to the host apparatus in the printing system. The packet Close Channel Reply Packet includes the first through tenth bytes, and a header portion includes the first through sixth bytes.

In FIG. 40, a parameter Result is set in the eighth byte. The ninth and tenth bytes represent a parameter including Primary Socket ID and Secondary Socket ID.

The host apparatus confirms that the channel is closed by receiving the packet Close Channel Reply Packet and analyzing the above-described parameter Result (step (21)).

After the channel has been closed, there is no problem to again open the channel by a packet Open Channel Command Packet if necessary (return to step (7)), or the control according to the IEEE 1284.4 may be terminated in that state.

In this case, the host apparatus provides a packet Exit Command Packet having the data structure shown in FIG. 41 and transfers this packet to the printing apparatus (step (22)).

FIG. 41 is a diagram illustrating the data structure of the packet Exit Command Packet notified from the host apparatus to the printing apparatus in the printing system. The packet Exit Command Packet includes the first through seventh bytes, and a header portion includes the first through sixth bytes.

In FIG. 41, a command Exit, Command is set in the seventh byte.

When the printing apparatus has received the packet Exit Command Packet, the printing apparatus terminates the processing according to the IEEE 1284.4 (data exchange on the opened channel, and the like) (step (23)), and then forms a reply packet Exit Reply Packet having the data structure shown in FIG. 42 and transfers the formed packet to the host apparatus (step (24)).

FIG. 42 is a diagram illustrating the data structure of the packet Exit Reply Packet notified from the printing apparatus to the host apparatus in the printing system. The packet Exit Reply Packet includes the first through eighth bytes, and a header portion includes the first through sixth bytes.

In FIG. 42, a command Command is set in the seventh byte, and a result Result is set in the eighth byte.

The control according to the IEEE 1284.4 is thereby terminated, and the data transfer by the packet (conforming to the IEEE 1284.4) is also terminated.

When resuming the control according to the IEEE 1284.4, it is necessary to execute the control from processing of transferring the packet Init Command Packet. The command packet Exit Command Packet may, of course, be provided at any time while the control according to the IEEE 1284.4 is executed, as any other command packet Command Packet.

By executing the process until step (14) of the above-described flowcharts in order to open the channel, the transfer of the data packet can be started. However, the control is performed so that, when transferring the data packet, the transfer cannot be started unless acknowledging data Credit is not received from the processing of the apparatus where the data packet is to be transferred.

Thus, the IEEE 1284.4 realizes flow control of data (packet) (as for the Socket ID, when the processing A at the host apparatus side transfers the packet to the processing "a" at the printing apparatus side, the processing A cannot process the packet unless a parameter Credit is not received from the processing "a"). When storing data transferred from the communication partner in resources (storage means, capable of reading and writing data, which is generally called a buffer storage or the like, and which is hereinafter termed a reception buffer storage assuming the printing apparatus) possessed by the user, the processing will not be normally operated by missing transferred data, unless control is performed so as not to receive data to an amount exceeding the capacity of the reception buffer storage. The flow control adjusts interruption and resumption of data transfer in order to prevent such a situation.

Next, a description will be provided of the concept of the parameter Credit used in the flow control of packet transfer in the IEEE 1284.4.

The parameter Credit is provided from the packet receiving side to the packet transmitting side in order to indicate to what extent the receiving side is ready to receive the packet. The packet receiving side guarantees that the packet provided as the parameter Credit can be assuredly received.

For the exchange of the parameter Credit, an acknowledgment command packet Credit Command Packet and an acknowledgment request command packet Credit Request Command Packet and a packet Reply Packet corresponding to these packets are mainly used. However, the parameter Credit may also be provided by a packet Data Packet or Open Packet, except for a command channel which already has two parameters Credit at initialization, in order to allow execution of Init or Error processing according to the IEEE 1284.4 in any case.

Next, state transition of a simple parameter Credit will be described with reference to FIG. 43.

FIG. 43 is a diagram illustrating state transition of the parameter Credit between the host apparatus and the printing apparatus in the printing system.

In an initial state in which power is supplied to the apparatuses (the host apparatus and the printing apparatus), the parameter Credit on the internal command channel is set to "2", and the parameter Credit on the channel (which is not yet opened at this stage) for transferring data (a packet) is, of course, set to "0".

In this example, only one channel for transferring data is shown. When a plurality of channels are opened, the control of the parameter Credit is performed for each channel.

When the host apparatus intends to start control according to the IEEE 1284.4 using an initial command packet Init Command Packet, the parameter Credit on the command channel at the host apparatus side is decremented by one to assume "1" according to the provision of the packet Init Command Packet. At the same time, at the printing apparatus side, when the packet Init Command Packet has been received, the acknowledgment Credit on the command channel is incremented by one to assume "3". This is because it is promised that "1" is always present in the parameter Credit (the fifth byte of the header portion) of the packet transferred on the command channel. If the parameter Credit assumes "0" on the command channel and therefore the packet cannot be transferred, the succeeding processing cannot be performed. The above-described promise is provided in order to prevent such a case.

By transmitting a reply packet Init Reply Packet in response to the packet Init Command Packet from the printing apparatus, the parameter Credit on the command channel of the printing apparatus is decremented by one to assume "2", and the parameter Credit on the command channel of the host apparatus is incremented by one to return to "2".

When the host apparatus intends to open a data channel according to the packet Open Channel Command Packet, and the printing apparatus normally transmits a reply Open Channel Reply in response to this operation, by providing the host apparatus with two parameters Credit using the parameter Credit (the fifteenth and sixteenth bytes) in the packet Open Channel Reply Packet, the parameter Credit on the channel for transferring data at the host apparatus side is incremented by two to assume "2".

Since the host apparatus has been able to open the channel for transferring data and has received the parameter Credit for this channel from the printing apparatus, it becomes possible to transfer a packet Data Packet. Hence, the host apparatus transfers two consecutive packets Data Packet. For the second packet Data Packet, a parameter Credit on the channel for transferring data to the printing apparatus is provided using the parameter Credit (the fourth byte) of the packet Data Packet. At that time, the parameter Credit on the channel for transferring data in the printing apparatus is incremented by one to assume "1".

The parameter Credit on the command channel remains "2" because a packet Command Packet is not transferred (the printing apparatus does not transfer a packet Command Packet either). At that time, the printing apparatus can also transfer a packet Data Packet to the host apparatus.

The host apparatus has transferred two consecutive packets Data Packet and therefore used up parameters Credit on the channel for transferring data possessed by the host apparatus. Hence, in order to transfer the next packet Data Packet, the host apparatus requests a parameter Credit from the printing apparatus using a packet Credit Request Command Packet having the data structure shown in FIG. 44.

FIG. 44 is a diagram illustrating the data structure of the packet Credit Request Command Packet for requesting a parameter Credit in the printing system. This packet includes the first through thirteenth bytes, and a header portion includes the first through sixth bytes.

In FIG. 44, a parameter request Credit Requested is set in the tenth and eleventh bytes.

The printing apparatus to which a parameter Credit has been requested by the packet Credit Request Command Packet analyzes the contents of the request (from the parameter), and transfers a reply Reply corresponding to the request. In this case, it is assumed that only one parameter Credit can be provided for the host apparatus. The provided parameter Credit is entered in the parameter Credit (the eleventh and twelfth bytes) of the reply Credit Request Reply, and is transferred to the host apparatus by a packet Credit Request Reply Packet having the data structure shown in FIG. 45.

FIG. 45 is a diagram illustrating the data structure of the packet Credit Request Reply Packet in the printing system. This packet includes the first through twelfth bytes, and a header portion includes the first through sixth bytes.

In FIG. 44, the parameter Credit is set in the eleventh and twelfth bytes.

By thus receiving the packet Credit Request Reply Packet, the parameter Credit on the channel for data transfer of the host apparatus is incremented by one to assume “1”, so that it is possible to again transfer a packet Data Packet.

Since a parameter Credit for data transfer has been provided from the host apparatus, the printing apparatus can also transfer one packet Data Packet.

As shown in FIG. 43, if the printing apparatus transfers one packet Data Packet, the parameter Credit possessed by the printing apparatus is decremented by one to assume “0”. It is, of course, possible to provide the host apparatus with a parameter Credit using the parameter Credit in this packet Data Packet. The number of parameters Credit possessed by the host apparatus increases by the provided parameter Credit.

In FIG. 43, the parameter Credit for data transfer is incremented by one to assume “2”.

An outline of the IEEE 1284.4 has been described.

However, since conventional nonpacket protocols are also used in addition to packet protocols in the current Centronics I/Fs, a packet protocol is used in certain data transfer, and data is transferred according to a conventional nonpacket protocol without using a packet protocol in another data transfer.

In such a case, if data transferred using a packet protocol is interpreted with a nonpacket protocol, a header portion is considered to be data, so that unnecessary extra data is received, On the other hand, if data transferred using a nonpacket protocol is interpreted with a packet protocol, an ordinary data portion is considered to be a packet header, so that a part of data of the packet is not given to the translater, thereby causing various problems.

A single printer is often shared by a plurality of host apparatuses. In such a case, a certain host apparatus may transmit data using a packet protocol, and another host apparatus may transfer data using a conventional nonpacket protocol, so that the printer cannot determine whether or not a packet protocol is to be used.

From the structure of a packet protocol, it is difficult to shift to a nonpacket protocol when the packet protocol has been used, and vice versa.

SUMMARY OF THE INVENTION

The present invention has been made in consideration of the above-described problems.

It is an object of the present invention to provide a communication control apparatus, a communication control method and a storage medium storing a communication control program in which, when packet data has been received from a data processing apparatus, the packet data is stored in a first area or a second area of a memory in accordance with a type of data in order to use a packet protocol, and when nonpacket data has been received from the data processing apparatus, the nonpacket data is stored in the first area of the memory in order to use a nonpacket protocol.

According to one aspect, the present invention relates to a communication control apparatus for performing two-way communication processing with a data processing apparatus via a predetermined interface. The communication control apparatus includes storage means having a first area and a second area for storing data received from the data processing apparatus, and control means for storing, when packet data has been received from the data processing apparatus, the packet data in the first area or the second area in accordance with a type of data in order to use a packet protocol, and for storing, when nonpacket data has been received from the data processing apparatus, the nonpacket data in the first area in order to use a nonpacket protocol.

According to another aspect, the present invention relates to a communication control method in a communication control apparatus for performing two-way communication processing with a data processing apparatus via a predetermined interface. The communication control method includes the steps of storing, when packet data has been received from the data processing apparatus, the packet data in a first area or a second area of a memory in accordance with a type of data in order to use a packet protocol, and storing, when nonpacket data has been received from the data processing apparatus, the nonpacket data in the first area in order to use a nonpacket protocol.

According to still another aspect, the present invention relates to a storage medium storing a control program to be used in a communication control apparatus for performing two-way communication processing with a data processing apparatus via a predetermined interface. The storage medium includes a code of storing, when packet data has been received from the data processing apparatus, the packet data in a first area or a second area of a memory in accordance with a type of data in order to use a packet protocol, and a code of storing, when nonpacket data has been received from the data processing apparatus, the nonpacket data in the first area in order to use a nonpacket protocol.

The foregoing and other objects, advantages and features of the present invention will become more apparent from the following description of the preferred embodiments taken in conjunction with the accompanying drawings.

BRIEF DESCRIPTION OF THE DRAWINGS

FIG. 21 is a diagram illustrating a memory map of a storage medium storing various data processing programs capable of being read by the communication control apparatus according to the third embodiment;

FIG. 24 is a diagram illustrating the concept of the relationship between each communication control program and application in the printing system;

FIG. 25 is a diagram illustrating the configuration of a communication packet utilized in a communication interface of the printing system;

FIGS. 26A and 26B are diagrams illustrating examples of communication data exchanged in the communication interface of the printing system;

FIGS. 32 through 34 are flowcharts illustrating a data communication processing procedure in the printing system;

FIG. 35 is a diagram illustrating the data structure of an initial command packet notified from a host apparatus to an apparatus serving as a communication partner (a printing apparatus) in the printing system;

FIG. 36 is a diagram illustrating the data structure of a reply packet notified from the printing apparatus to the host apparatus in the printing system;

FIG. 37 is a diagram illustrating the data structure of an open command packet notified from the host apparatus to the printing apparatus in the printing system;

FIG. 38 is a diagram illustrating the data structure of an open channel reply packet notified from the printing apparatus to the host apparatus in the printing system;

FIG. 39 is a diagram illustrating the data structure of a close channel command packet notified from the host apparatus to the printing apparatus in the printing system;

FIG. 40 is a diagram illustrating the data structure of a close channel reply packet notified from the printing apparatus to the host apparatus in the printing system;

FIG. 41 is a diagram illustrating the data structure of an exit command packet notified from the host apparatus to the printing apparatus in the printing system;

FIG. 42 is a diagram illustrating the data structure of an exit reply packet notified from the printing apparatus to the host apparatus in the printing system;

FIG. 43 is a diagram illustrating state transition of a parameter Credit between the host apparatus and the printing apparatus in the printing system;

FIG. 44 is a diagram illustrating the data structure of a parameter request command packet for requesting the parameter Credit in the printing system; and FIG. 45 is a diagram illustrating the data structure of a parameter request reply packet in the printing system.

DESCRIPTION OF THE PREFERRED EMBODIMENTS

First Embodiment

Figure 1:
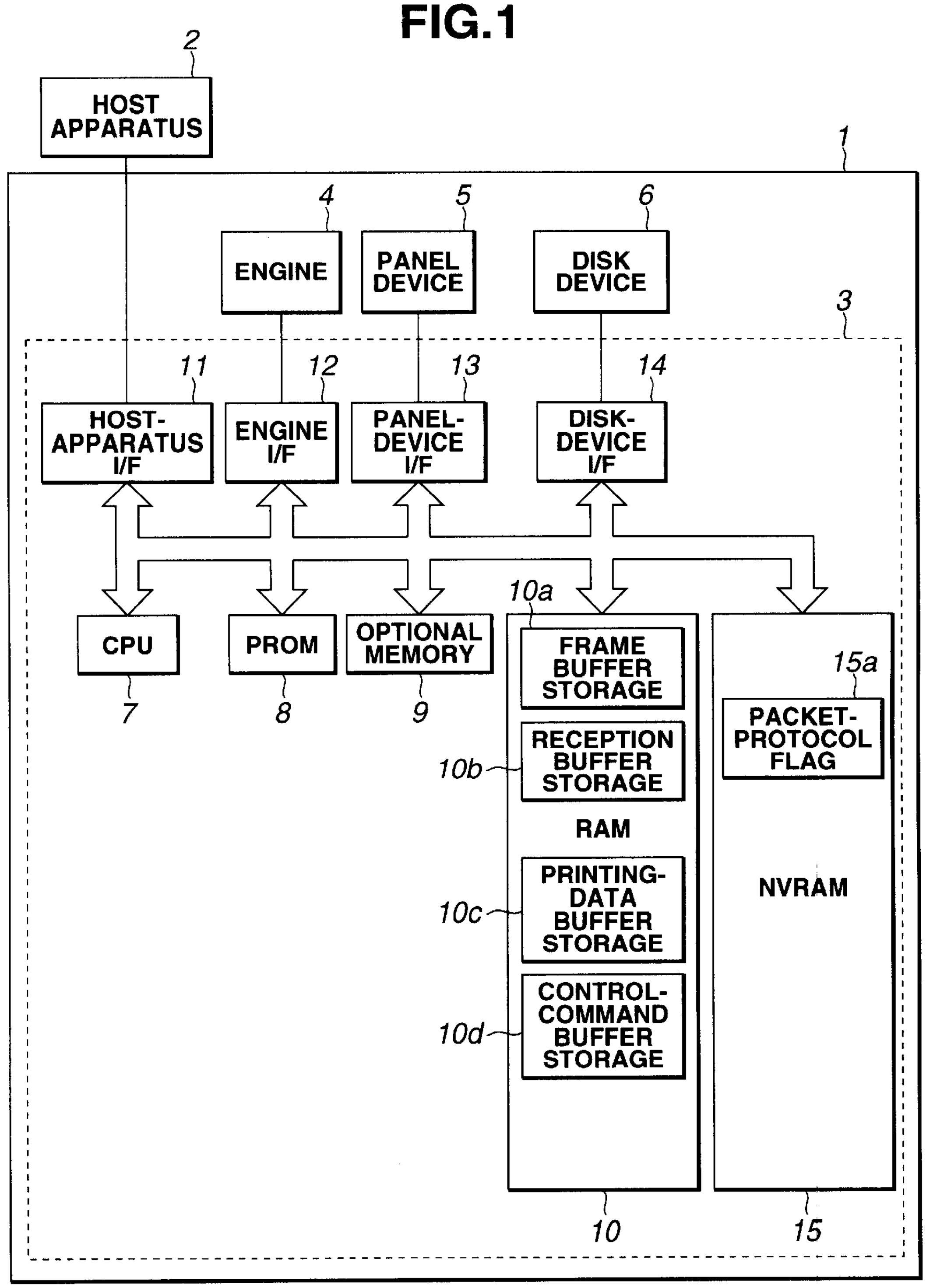
FIG. 1 is a block diagram illustrating the configuration of a printing apparatus according to a first embodiment of the present invention.

FIG. 1 is a block diagram illustrating the configuration of a printing system to which a printing apparatus can be applied according to a first embodiment of the present invention. For example, a laser-beam printer is used as the printing apparatus.

In FIG. 1, a laser-beam printer (hereinafter abbreviated as an "LBP") 1 includes a printer controller 3 (hereinafter abbreviated as a "controller"), an engine 4, a panel device 5, and a disk device 6. The LBP 1 is connected to an external host apparatus 2, so as to execute printing processing by receiving printing data and the like from the host apparatus 2.

In the controller 3, a CPU (central processing unit) 7 controls respective units based on various control programs stored in a PROM (programmable read-only memory). The PROM 8 also stores programs to be referred to by the CPU 7 when determining a mode to be used during communication. The PROM 8 also stores programs to be referred to by the CPU 7 when determining a packet protocol to be used.

A host-apparatus interface (hereinafter an interface is abbreviated as an "I/F") 11 communicates printing data and the like with the host apparatus 2. An engine I/F 12 communicates with the engine 4 which actually performs printing. Reference numeral 13 represents a panel-device I/F. For example, the panel-device I/F 13 indicates the state of the LBP 1 to the user, or the user assigns a change in printing environment to the LBP 1. A disk-device I/F 14 communicates with the disk device 6.

Reference numeral 9 represents an insertable/drawable optional memory for storing fonts and the like. A card, an optional ROM, a flash memory or the like may be adopted as the optional memory 9. Reference numeral 10 represents a RAM (random access memory). Regions, such as a frame buffer storage 10*a* for temporarily storing image data, a reception buffer storage 10*b* for temporarily storing data input from the host apparatus 2, such as printing data and the like, a printing-data buffer storage 10*c* for storing printing data, a control-command buffer storage 10*d* for storing control commands, and the like, are secured in the RAM 10. The RAM 10 is also used as a working area for the CPU 7.

Reference numeral 15 represents an NV(nonvolatile) RAM. Regions, such as a packet protocol flag 15*a* for storing setting whether or not a packet protocol is to be used, and the like, are secured in the NVRAM 15. The packet protocol flag 15*a* has a value "0" or "1". The user can set the value "0" or "1" through an operation on the panel device 5 (to be described later). The NVRAM 15 is also used as a region for storing various setting values.

The panel device 15 includes, for example, a liquid-crystal panel display for displaying information relating to the state of the LBP 1 or the like in the form of a character string, various operation buttons for allowing the operator to perform various operations for the LBP 1, and LEDs (light-emitting diodes) for notifying the operator of a sheet feeding location, a on-line/off-line state and the like. The operator can also set whether or not a packet protocol is to be used via the panel device 5.

The disk device 6 is an external storage device for storing various data. A hard-disk device, a magnetooptical-disk device, a floppy-disk device or the like may be used as the disk device 6. The engine 4 actually prints image data on a printing medium. Electric power is supplied to the LBP 1 from a power-supply unit (not shown).

Figure 2:
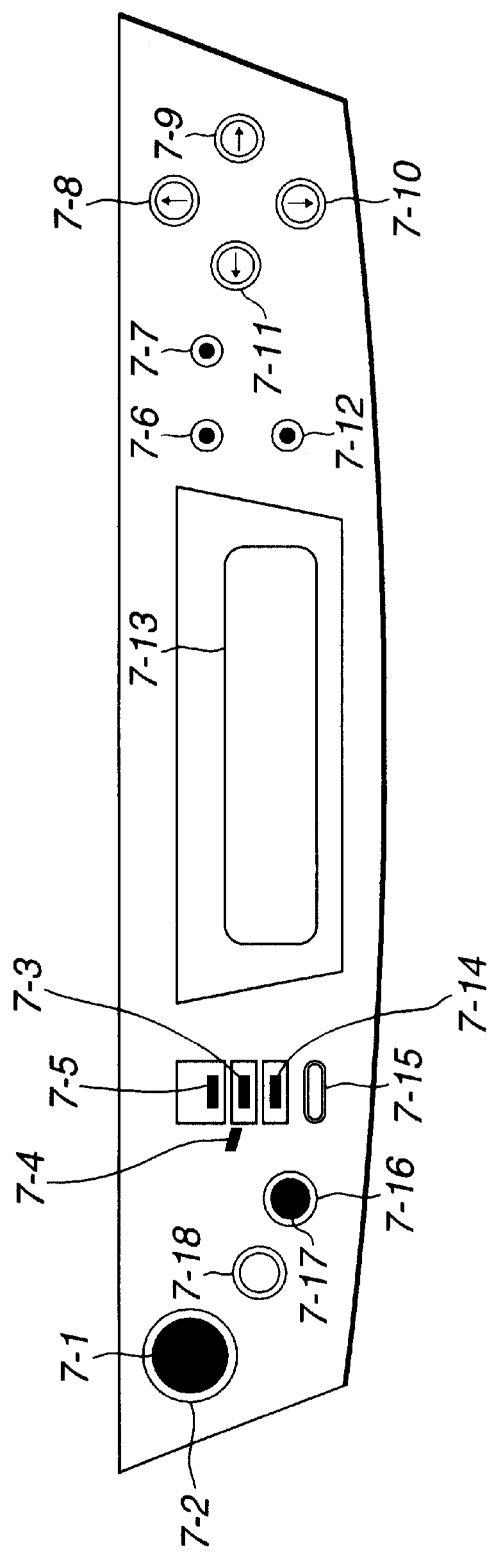
FIG. 2 is a plan view illustrating an example of the panel device shown in FIG. 1.

FIG. 2 is a plan view illustrating an example of the panel device 5 shown in FIG. 1.

In FIG. 2, an on-line LED 7-1 indicates whether the LBP 1 is in an on-line state or in an off-line state. An on-line key 7-2 is used for causing shift between the on-line state and the off-line state. A middle-stage sheet feeding LED 7-3 is lit when middle-stage sheet feeding has been selected. A tray sheet feeding LED 7-4 is lit when tray sheet feeding has been selected.

An upper-stage sheet feeding LED 7-5 is lit when upper-stage sheet feeding has been selected. A printable LED 7-6 is lit when an error and the like are not generated, and printing can be performed. A job LED 7-7 is lit during a job.

An upward-arrow key (also operating as a mode key) 7-8 is used for movement in the upward direction when operating a printing-environment menu. A rightward-arrow key (also operating as a menu key) 7-9 is used for movement in the rightward direction when operating the printing environment menu. In the ordinary off-line state, the key 7-9 is depressed when entering the printing environment menu.

A downward-arrow key (also operating as a utility key) is used for movement in the downward direction or for determining a menu value when operating the printing environment menu. A leftward-arrow key 7-11 (also operating as a utility key) is used for movement in the leftward direction when operating the printing environment menu.

An alarm LED 7-12 is lit when error is generated. A status display unit 7-13 displays, for example, a character string indicating the state of the printer, or the contents of the printing environment menu. A sheet-feeding selection key 7-15 is used for changing the sheet feeding location. A duplex-mode selection key 7-16 is used for setting duplex-mode printing. A duplex-mode LED 7-17 indicates whether or not the printing apparatus is currently set to the duplex-mode printing. A discharge key 7-18 is used when it is intended to forcedly discharge printed data.

Figure 3:
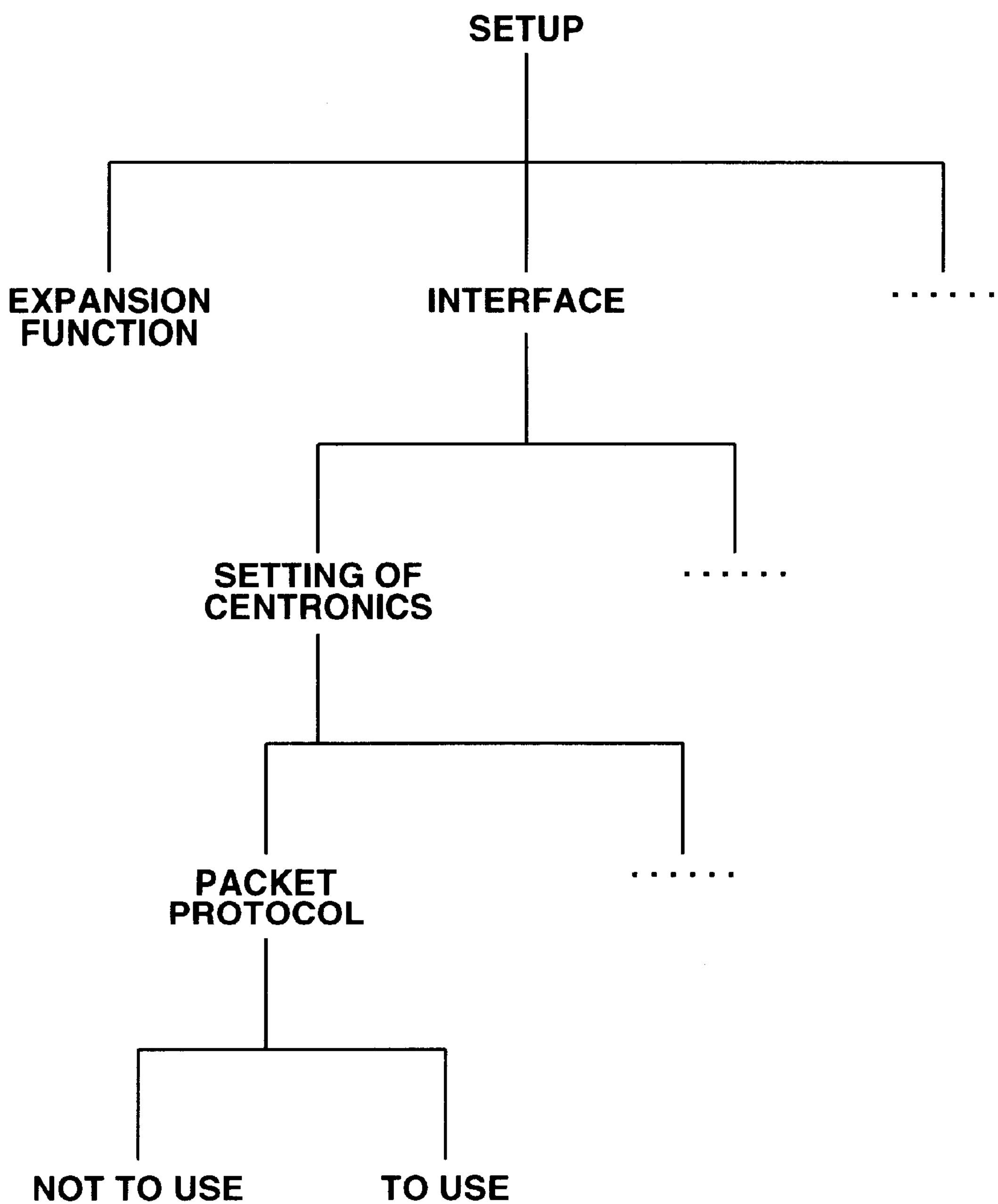
FIG. 3 is a diagram illustrating a procedure for setting a packet protocol in a communication control apparatus according to the first embodiment.

FIG. 3 illustrates a tree indicating an outline of the printing environment menu for setting whether or not the packet protocol is to be used.

FIG. 3 illustrates a procedure for setting the packet protocol in the communication control apparatus in the form of a tree. In this tree, setup is a "parent", followed by "children", "grandchildren", . . . in the downward direction.

It can be understood from FIG. 3 that, in order to operate setting values for the "packet protocol", after entering the printing environment menu in the panel device 5 shown in FIG. 1, "interface", "Centronix setting" and "packet protocol" may be set.

When "to use" has been set for the "packet protocol", a value "1" is set in the packet protocol flag 15*a* shown in FIG. 1. On the other hand, when "not to use" has been set for the "packet protocol", a value "0" is set in the packet protocol flag 15*a* secured in the NVRAM 15 shown in FIG. 1 in a nonvolatile state.

The characteristic configuration of the first embodiment will now be described with reference to FIG. 1 and other figures.

A communication control apparatus (the controller 3) for performing two-way communication processing with a data processing apparatus (the host apparatus 2) via a predetermined interface having the above-described configuration (in the first embodiment, a two-way communication interface conforming to the IEEE 1284.4, such as a Centronics interface) includes a storage unit capable of securing a plurality of memory regions for storing data received from the data processing apparatus (the RAM 10 where the frame buffer storage 10*a*, the reception buffer storage 10*b*, the printing-data buffer storage 10*c*, the control-command buffer storage 10*d* and the like can be secured), a setting unit for setting the type of a protocol to be used for the communication processing (in the first embodiment, the setting is performed through the panel device 5, although the setting may be performed by a command from the host apparatus 2), a determination unit for determining whether or not the type of the protocol set by the setting unit indicates a packet protocol (the CPU 7 determines from the state of setting of the packet-protocol flag 15*a* by executing a control program stored in the PROM 8), and a control unit for changing destination of each data by determining the type of data in the received data stored in the storage unit when the determination unit has determined that the type of the set protocol indicates a packet protocol (the CPU 7 controls the destination of the data to one of the printing-data buffer storage 10*c* and the control-command buffer storage 10*d* by executing a control program stored in the PROM 8). Hence, the user or the like can set whether or not a specific packet protocol is to be used, and it is possible to freely construct a data communication environment capable of flexibly dealing with the user's request of packet communication.

The CPU 7 discriminates control commands from data other than the control commands in a portion other than the header portion within the received data, and moves the respective data to different memory regions (the control-command buffer storage 10*d* and the printing-data buffer storage 10*c*). Hence, it is possible to discriminate control commands peculiar to the packet protocol from other data, and normally process the respective data. The control commands peculiar to the packet protocol indicate job control commands for controlling respective jobs transmitted by packet communication, such as a job cancelling command and the like.

The communication control apparatus also includes a nonvolatile memory (the NVRAM 15) for storing, for example, the type of the protocol set by the panel device 5 in a nonvolatile manner. Hence, it is possible to assuredly start data communication in which the communication environment set by the user is faithfully reflected.

Since the data other than the control commands is used as printing data, it is possible to assuredly prevent a case in which a control command is processed as printing data, and to perform processing of printing data for obtaining a normal printing result.

A description will now be provided of a setting operation and the contents of display on the status display unit 7-13 on the panel device 5 when using the packet protocol, with reference to FIGS. 4–11.

FIGS. 4–11 are diagrams illustrating operational picture surfaces indicating a procedure for setting a packet protocol in the communication control apparatus according to the first embodiment.

Figure 4:
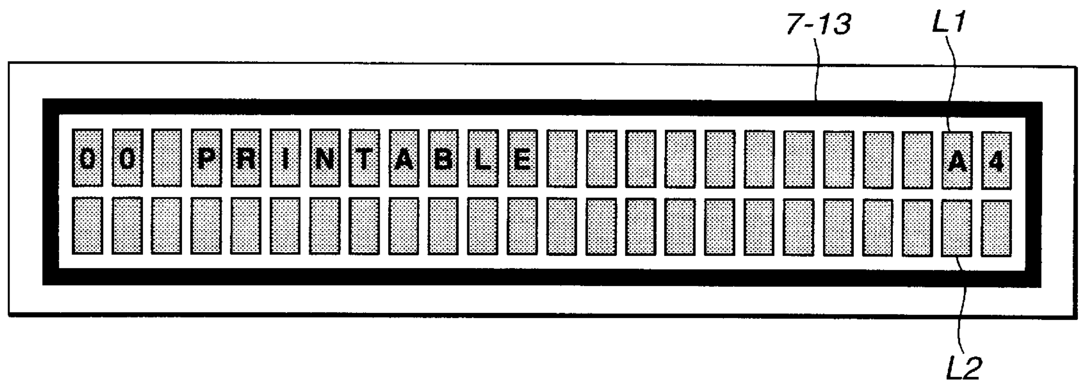
FIGS. 4 through 11 are diagrams illustrating operational picture surfaces showing a procedure for setting a packet protocol in the communication apparatus according to the first embodiment.

The status display unit 7-13 in the ordinary off-line state is as shown in FIG. 4. By depressing the rightward-arrow key 7-9 shown in FIG. 2, a printing environment menu is provided, and the display "00 printable A4" shown in FIG. 4 appears on the status display unit 7-13.

Figure 5:
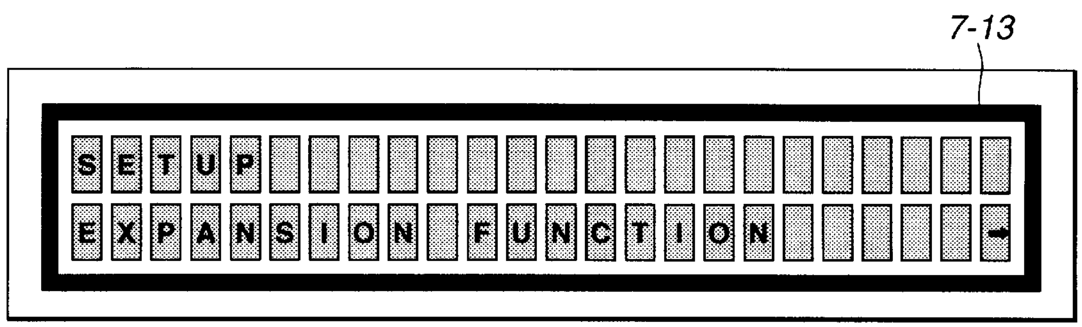

The first line L1 and the second line L2 on the status display unit 7-13 is in the relationship of a parent and a child. That is, in this case, a parent "setup" and a child "expansion function" are displayed. Referring to FIG. 3, the target "packet protocol" is lower than "interface", and the "interface" is present at the right of the "expansion function". Hence, the menu is moved to the right by depressing the rightward-arrow key 7-9. Then, a display of "setup" and "expansion function" shown in FIG. 5 is provided on the status display unit 7-13.

Figure 6:
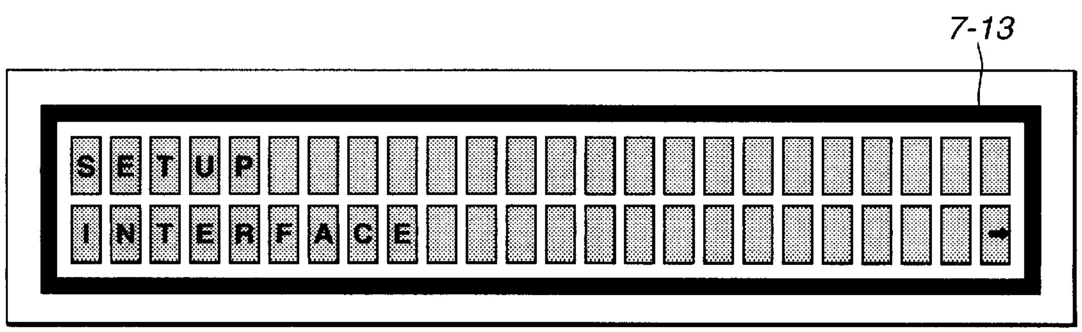
Figure 7:
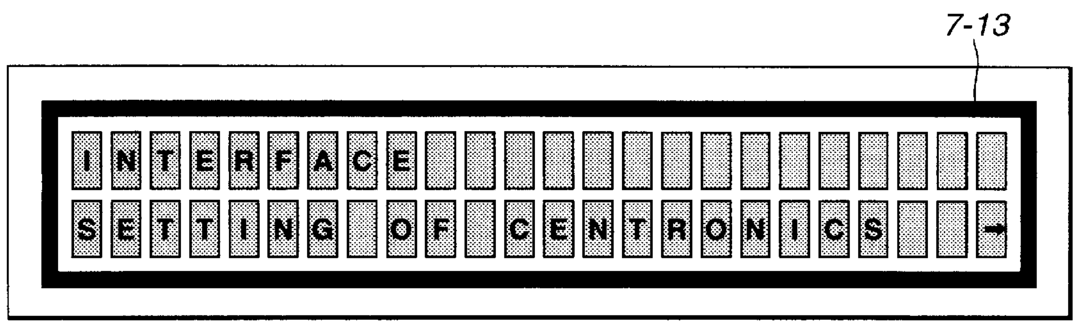
Figure 8:
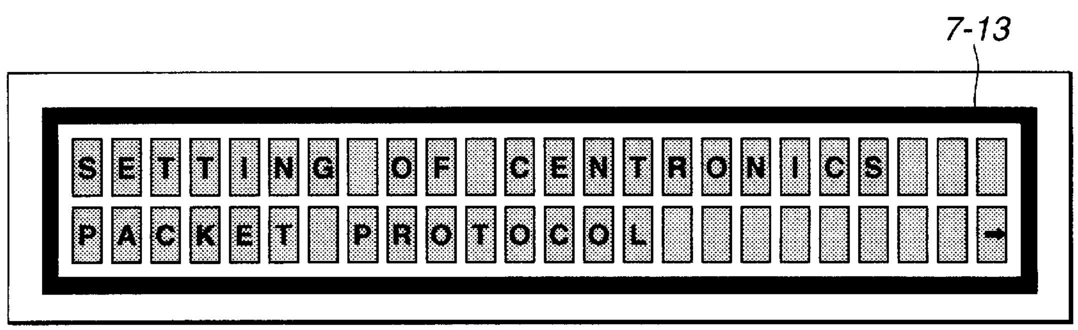

In order to display items below the "interface" shown in FIG. 3 from this display state, the downward-arrow key 7-10 is depressed, and the status display unit 7-13 provides the display picture surface shown in FIG. 6. By further depressing the downward-arrow key 7-10, the status display unit 7-13 provides the display picture surface shown in FIG. 7. By further depressing the downward-arrow key 7-10, the status display unit 7-13 provides the display picture surface shown in FIG. 8. By further depressing the downward-arrow key 7-10, the status display unit 7-13 provides the display picture surface shown in FIG. 9.

Figure 9:
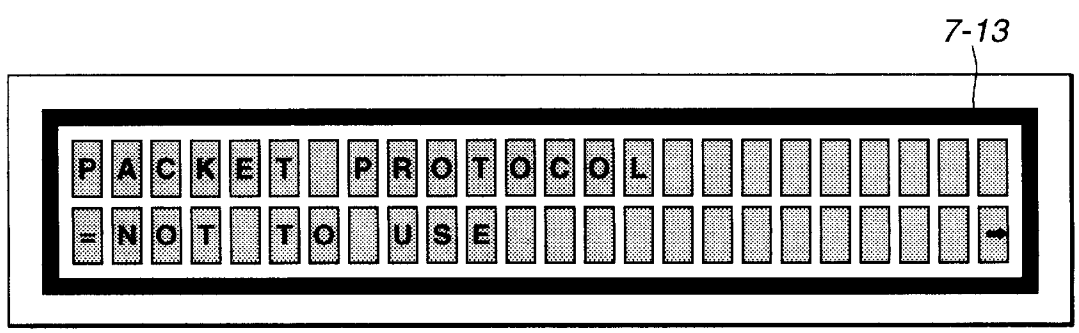

The symbol "=" displayed on the picture surface shown in FIG. 9 indicates that the "packet protocol" is set to "not to use".

Figure 10:
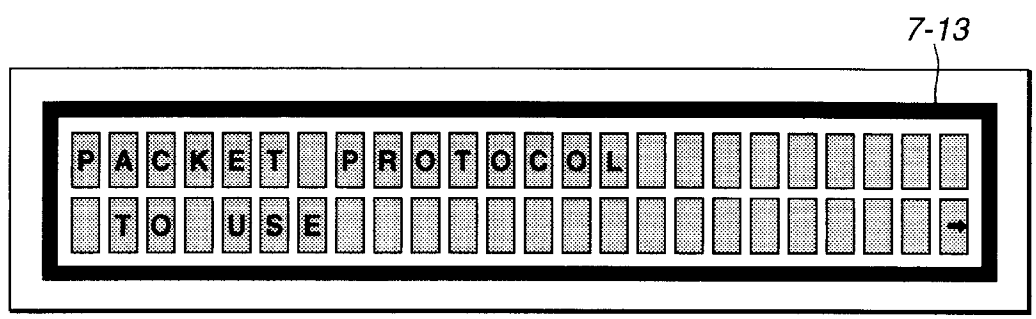
Figure 11:
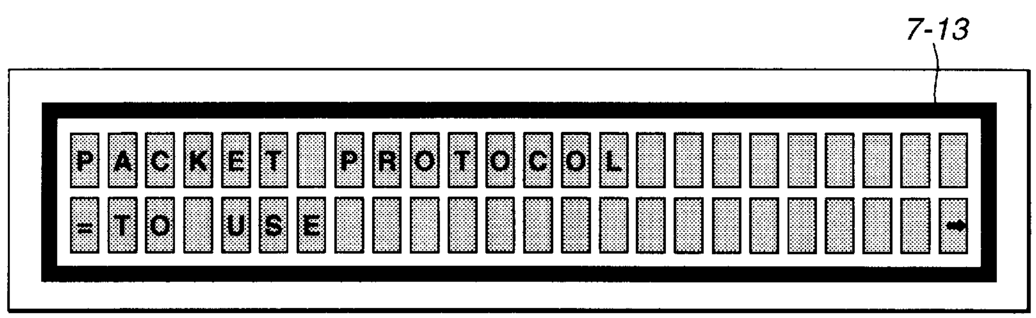

By depressing the rightward-arrow key 7-9 in this state, the status display unit 7-13 provides the picture surface shown in FIG. 10, where "to use" can be selected. By depressing the downward-arrow key 7-10 for performing determination, the status display unit 7-13 provides the display picture surface shown in FIG. 11, where it is indicated that the "packet protocol" is set to "to use".

At that time, a value "1" is set in the packet-protocol flag 15*a* in the NVRAM 15 shown in FIG. 1. Similarly, by setting "not to use" for the "packet protocol", a value "0" is set in the packet-protocol flag 15*a*.

An operation from the transmission of data from the host apparatus to the printer to the execution of printing processing will now be described. In order to simplify the description, it is assumed that in a conventional nonpacket mode, only printing data is transmitted, and control commands in the first embodiment are not transmitted. Control commands (an image drawing command, a sheet discharging command and the like) included in the printing data are different from control commands in the first embodiment.

When data is input from the host apparatus 2 to the LBP 1 via the host-apparatus I/F 11, notification of interrupt instructing storage of input data is performed for the CPU 7. Processing for storing input data which is executed by the controller 3 in this case will now be described with reference to the flowchart shown in FIG. 12.

Figure 12:
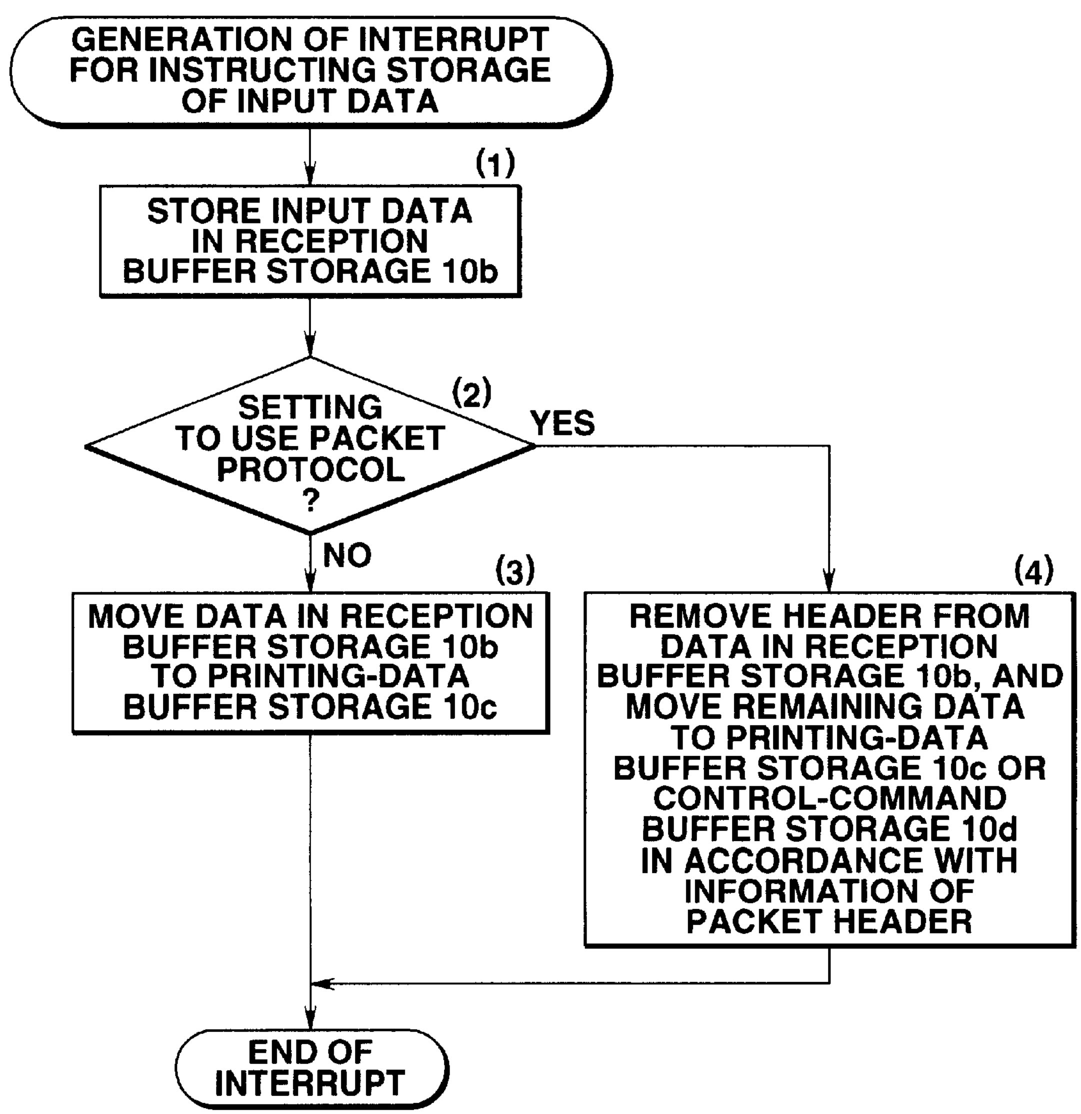
FIG. 12 is a flowchart illustrating a data processing procedure in the communication control apparatus according to the first embodiment.

FIG. 12 is a flowchart illustrating a data processing procedure in the communication apparatus according to the first embodiment. In FIG. 12, numerals (1)–(4) represent respective steps.

When notification of interrupt for instructing storage of input data has been provided from the host apparatus 2, then, in step (1), the CPU 7 stores the input data into the reception buffer storage 10*b* via the host-apparatus I/F 11. When all the input data has been stored, then, in step (2), the value of the packet-protocol flag 15*a* in the NVRAM 15 shown in FIG. 1 is referred to. Different control is performed depending on whether the value of the packet-protocol flag 15*a* is "0" or "1". That is, when the packet-protocol flag 15*a* has a value "0", that indicates that the packet protocol is not to be used. Hence, the process proceeds to step (3), where data in the reception buffer storage 10*b* is moved to the printing-data buffer storage 10*c*. Then, the interrupt processing is terminated.

On the other hand, when the value of the packet-protocol flag 15*a* is "1", that indicates that the packet protocol is to be used. Hence, the process proceeds to step (4), where the data of the reception buffer storage 10*b* is moved to the printing-data buffer storage 10*c* or the control-command buffer storage 10*d* in accordance with information indicated in the packet header. At that time, only a portion other than the packet header is moved. Then, the interrupt processing is terminated.

As described above, according to interrupt occurred every time data is input from the host apparatus 2, the input data is stored in the reception buffer storage 10*b*. Then, in accordance with the value of the packet-protocol flag 10*a* or information in the packet header, the input data is stored in the printing-data buffer storage 10*c* or the control-command buffer storage 10*d*.

Next, a description will be provided of an outline of printing processing performed by the LVP 1 when input data from the host apparatus 2 is stored in the printing-data buffer storage 10*c* according to interrupt for storing the input data, with reference to FIG. 1.

When the CPU 7 has recognized that the input data has been stored in the printing-data buffer storage 10*c*, the CPU 7 interprets printing data stored in the printing-data buffer storage 10*c* by referring to a printing-data analysis program stored in the PROM 8, and converts the printing data into image data. The image data provided by the CPU 7 is stored into the frame buffer storage 10*a*.

The CPU 7 continues the processing by referring to the printing-data analysis program in the above-described manner. When the CPU 7 has found a sheet discharging command in the printing data, the CPU 7 transmits the image data stored in the frame buffer storage 10*a* to the engine 4 via the engine I/F 12. Upon reception of the image data transmitted from the CPU 7 via the engine I/F 12, the engine 4 provides printing output of the image data on an actual recording medium.

As described above, when data has been input from the host apparatus 2, the LBP 1 performs printing processing, and image data is actually output on a recording medium.

Ad described above, when a value "1" is stored in the packet-protocol flag 15*a*, the printing apparatus operates using the packet protocol, and when a value "0" is stored in the packet-protocol flag 15*a*, the printing apparatus operates using a conventional nonpacket protocol without using the packet protocol.

That is, by referring to the packet-protocol flag 15*a* preset by the user, and performing an operation in accordance with the contents of the packet-protocol flag 15*a*, it is possible to perform an operation as desired by the user.

Although in the first embodiment, the case of setting a mode to be used through the panel device 5 has been described, the setting means is not limited to such a device, and the mode may be set by any other appropriate means. For example, the mode may be set by a command instructed from the host apparatus 2.

A description will now be provided of an example in which the mode of using a packet protocol is set by an instruction from the host apparatus 2 in a situation in which the packet protocol is not used, with reference to FIG. 1.

When data "SET PACKET PROTOCOL=USE ¥n" representing a command for setting the use of a packet protocol has been transmitted from the host apparatus 2, notification of interrupt for instructing storage of input data is performed for the CPU 7, as described above.

The CPU 7 stores the input data "SET PACKET PROTOCOL=USE ¥n" in the reception buffer storage 10*b* via the host-apparatus I/F 11, and refers to the value of the packet-protocol flag 15*a* after completing the storage processing. Since setting of not using a packet protocol is provided in this case, the CPU 7 moves the data stored in the reception buffer storage 10*b* to the printing-data buffer storage 10*c*.

The CPU 7 temporarily terminates interrupt. Then, the CPU 7 recognizes that the input data has been stored in the printing-data buffer storage 10*c*, and analyzes the data "SET PACKET PROTOCOL=USE ¥n" stored in the printing-data buffer storage 10*c* by referring to the analysis program stored in the PROM 8. The data is interpreted as a command for setting the use of a protocol by the analysis program, and the CPU 7 sets a value "1" in the packet-protocol flag 15*a*.

Thus, it is possible to set a mode to be used according to a command instructed from the host apparatus 2.

It is also possible to provide setting of not using a packet protocol by an instruction from the host apparatus 2 when a packet protocol is used.

The characteristic configuration of the first embodiment will now be described with reference to FIG. 12 and other figures.

A data processing method for a communication control apparatus for performing two-way communication processing with a data processing apparatus (the host apparatus 2) via a predetermined interface having the above-described configuration (in the first embodiment, a two-way communication interface conforming to the IEEE 1284.4, such as a Centronics interface), or a storage medium storing a program capable of being read by a computer for controlling an apparatus for performing two-way communication processing with a data processing apparatus via a predetermined interface includes a storage step of storing data received from the data processing apparatus in one of regions of a memory capable of securing a plurality of memory regions for storing the data (the reception buffer storage 10*b* in the RAM 10) (step (1) in FIG. 12), a setting step of setting the type of a protocol to be used for the communication processing (preprocessing of step (1) shown in FIG. 12, not shown), a determination step of determining whether or not the type of the protocol set in the setting step indicates a packet protocol (step (2) shown in FIG. 12), and a transfer step of transferring respective data to different regions in the memory (the printing-data buffer storage 10*c* and the control-command buffer storage 10*d*) by determining the type of data in the received data stored in some region of the memory when the determination step has determined that the type of the set protocol indicates a packet protocol (step (3) or step (4) shown in FIG. 12). Hence, the user or the like can set whether or not a specific packet protocol is to be used, and it is possible to freely construct a data communication environment capable of flexibly dealing with the user's request of packet communication.

Second Embodiment

In the first embodiment, the operation is performed in accordance with the packet-protocol flag 15*a*. However, in the case of a host-apparatus I/F having a plurality of communication modes, it is more useful if whether or not a packet protocol is to be used can be set for each communication mode. A second embodiment of the present invention which performs such an operation will now be described. In order to simplify the description, only data transmission from a host apparatus to a printer will be described.

A case in which a Centronics host-apparatus interface supports a compatible mode and an ECP mode as communication modes for transmitting data from a host apparatus to a printer.

Figure 13:
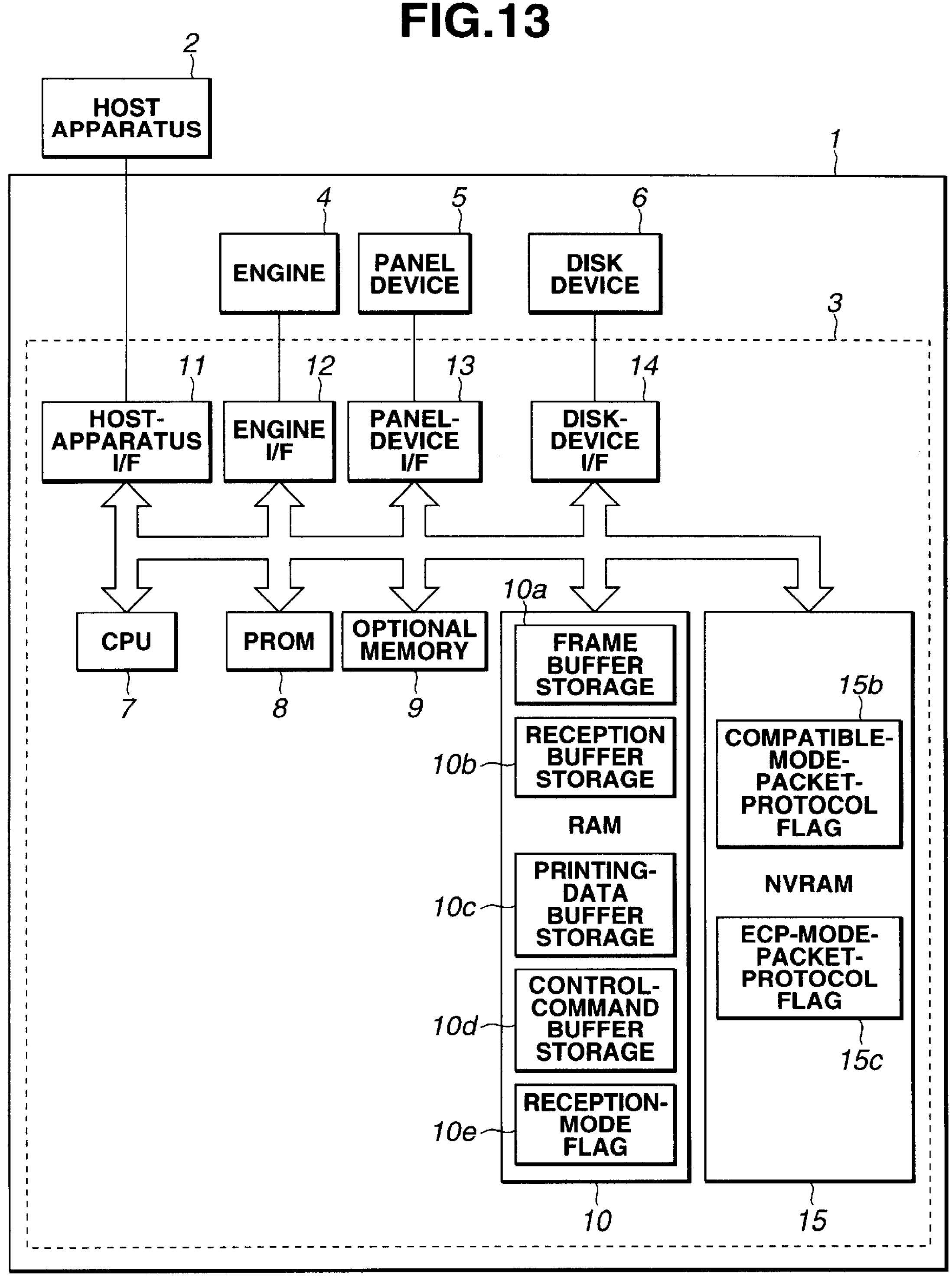
FIG. 13 is a block diagram illustrating the configuration of a printing system to which a communication control apparatus can be applied according to a second embodiment of the present invention.

FIG. 13 is a block diagram illustrating the configuration of a printing system to which a communication control apparatus can be applied according to the second embodiment. In FIG. 13, the same components as those shown in FIG. 1 are indicated by the same reference numerals.

In FIG. 13, a RAM 10 includes regions, such as a frame buffer storage 10*a* for storing image data, a reception buffer storage 10*b* for temporarily storing data input from a host apparatus 2, such as printing data and the like, a printing-data buffer storage 10*c* for storing printing data, a control-command buffer storage 10*d* for storing control commands, and the like. In addition, a reception-mode flag 10*e* is secured in the RAM 10.

A value "0" or "1" is stored in the reception-mode flag 10*e* in accordance with the communication mode when storing input data in the reception-buffer storage 10*b*. The RAM 10 is also used as a working area for a CPU 7.

In the second embodiment, regions, such as a compatible-mode-packet-protocol flag 15*b* for storing setting whether or not a packet protocol is to be used in the compatible mode, an ECP-mode-packet-protocol flag 15*c* for storing setting whether or not a packet protocol is to be used in the ECP mode, and the like, are secured in an NVRAM 15.

Each of the compatible-mode-packet-protocol flag 15*b* and the ECP-mode-packet-protocol flag 15*c* has a value "0" or "1".

The user can set one of these values in each of the compatible-mode-packet-protocol flag 15*b* and the ECP-mode-packet-protocol flag 15*c* by an operation through a panel device 5. The NVRAM 15 is also used as a region for storing various setting values.

The characteristic configuration of the second embodiment will now be described with reference to FIG. 13 and other figures.

A communication control apparatus (a controller 3) for performing two-way communication processing with a data processing apparatus (the host apparatus 2) via a predetermined interface having the above-described configuration (in the second embodiment, a two-way communication interface conforming to the IEEE 1284.4, such as a Centronics interface) according to a plurality of communication modes (the compatible mode and the ECP mode) includes a storage unit capable of securing a plurality of memory regions for storing data received from the data processing apparatus (the RAM 10 where the frame buffer storage 10*a*, the reception buffer storage 10*b*, the printing-data buffer storage 10*c*, the control-command buffer storage 10*d* and the like are secured), a setting unit for setting the type of a protocol to be used for the communication processing (in the second embodiment, the setting is performed through the panel device 5, although the setting may be performed by a command from the host apparatus 2), a determination unit for determining whether or not the type of the protocol set by the setting unit for each communication mode indicates a packet protocol (the CPU 7 determines from the state of setting of the compatible-mode-packet-protocol flag 15*b* and the ECP-mode-packet-protocol flag 15*c* by executing a control program stored in a PROM 8), and a control unit for changing destination of each data by determining the type of data in the received data stored in the storage unit when the determination unit has determined that the type of the protocol set for each communication mode indicates a packet protocol (the CPU performs control so as to transfer the data to one of the printing-data buffer storage 10*c* and the control-command buffer storage 10*d* by executing a control program stored in the PROM 8). Hence, the user or the like can set whether or not a specific packet protocol is to be used for each communication mode, and it is possible to freely construct a data communication environment capable of flexibly dealing with the user's request of packet communication.

The CPU 7 discriminates control commands from data other than the control commands in a portion other than the header portion within the received data, and moves the respective data to different memory regions (the control-command buffer storage 10_d_ and the printing-data buffer storage 10_c_). Hence, it is possible to discriminate control commands peculiar to the packet protocol from other data, and normally process the respective data.

The communication control apparatus also includes a nonvolatile memory (the compatible-mode-packet-protocol flag 15_b_ and the ECP-mode-packet-protocol flag 15_c_ in the NVRAM 15) for storing the type of the protocol set by the panel device 5 for each communication mode in a nonvolatile manner. Hence, it is possible to assuredly start data communication in which the communication environment set by the user is faithfully reflected.

Since the data other than the control commands is used as printing data, it is possible to assuredly prevent a case in which a control command is processed as printing data, and to perform processing of printing data for obtaining a normal printing result.

The communication modes include a fist data communication mode (compatible mode) of communicating data from the host apparatus 2 to an apparatus having the communication control apparatus (for example, a printing apparatus), and a second communication mode of communicating data from the data processing apparatus to an apparatus having the communication control apparatus, and vice versa. Hence, it is possible to individually set whether or not a packet protocol is to be used in the first communication mode and in the second communication mode (ECP mode), and therefore to flexibly deal with a communication processing environment required by the user.

An operation from the transmission of data from the host apparatus to the printer to the execution of printing processing will now be described. In order to simplify the description, it is assumed that in a conventional nonpacket mode, only printing data is transmitted, and control commands are not transmitted.

When data is input from the host apparatus 2 to an LBP 1 via a host-apparatus I/F 11, notification of interrupt instructing storage of input data is performed for the CPU 7. In this notification of interrupt, a value "0" or "1" is stored in the reception-mode flag 10_e_.

That is, when data is received in the compatible mode a value "0" is stored in the reception-mode flag 10_e_, and when data is received in the ECP mode, a value "1" is stored in the reception-mode flag 10_e_. Processing of storing input data which is executed by the controller 3 will now be described with reference to the flowchart shown in FIG. 14.

Figure 14:
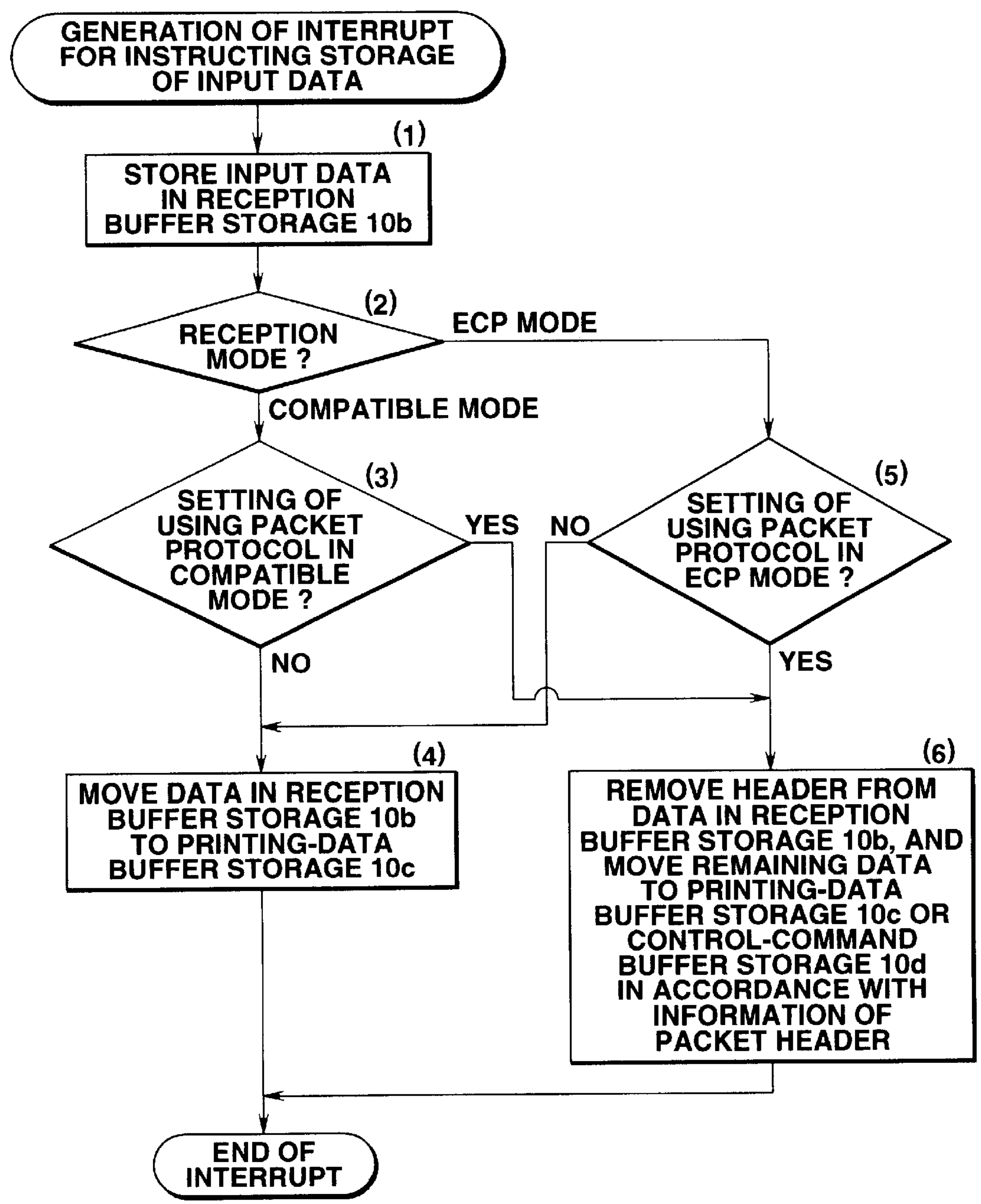
FIG. 14 is a flowchart illustrating a data processing procedure in the communication control apparatus according to the second embodiment.

FIG. 14 is a flowchart illustrating a data processing procedure in the communication apparatus according to the second embodiment. In FIG. 14, numerals (1)–(6) represent respective steps.

When notification of interrupt for instructing storage of input data has been provided from the host apparatus 2, then, in step (1), the CPU 7 stores the input data in the reception buffer storage 10_b_ via the host-apparatus I/F 11. When all the input data has been stored, then, in step (2), the value of the reception-mode flag 10_e_ is referred to. Different control is performed depending on whether the value of the reception-mode flag 15_e_ is "0" or "1".

That is, when the reception-mode flag 15_e_ has a value "0", that indicates that the data currently stored in the reception buffer 10_b_ has been received in the compatible mode. Hence, the process proceeds to step (3), where the value of the compatible-mode-packet-protocol flag 15_b_ is referred to. Different control is performed depending on whether the value of the compatible-mode-packet-protocol 15_b_ is "0" or "1". That is, when it is determined that the compatible-mode-packet-protocol flag 15_b_ has a value "0", that indicates that a packet protocol is not used. Hence, the process proceeds to step (4), where the data in the reception buffer storage 10_b_ is moved to the printing-data buffer storage 10_c_. Then, the interrupt processing is terminated.

On the other hand, when it is determined in step (3) that the value of the compatible-mode-packet-protocol flag 15_b_ is "1", that indicates that the packet protocol is to be used. Hence, the process proceeds to step (5), where the data of the reception buffer storage 10_b_ is moved to the printing-data buffer storage 10_c_ or the control-command buffer storage 10_d_ in accordance with information indicated in the packet header. At that time, only a portion other than the packet header is moved. Then, the interrupt processing is terminated.

On the other hand, if it is determined in step (2) that the value of the reception-mode flag 10_e_ is "1", that indicates that the data currently stored in the reception buffer storage 10_b_ has been received in the ECP mode. Hence, the process proceeds to step (6), where the value of the ECP-mode-packet-protocol 15_c_ is referred to.

Different control is performed depending on whether the value of the ECP-mode-packet-protocol flag 15_c_ is "0" or "1". That is, when the value of the ECP-mode-packet-protocol 15_c_ is "0", this indicates that a packet protocol is not to be used. Hence, the process proceeds to step (4), and the above-described processing is thereafter performed.

On the other hand, when it is determined in step (5) that the value of the ECP-mode-packet-protocol flag 15_c_ is "1", that indicates that a packet protocol is to be used. Hence, the process proceeds to step (6), and the above-described processing is thereafter performed.

As described above, according to interrupt occurred every time data is input from the host apparatus 2, the input data is stored in the reception buffer storage 10_b_. Then, in accordance with the value of the reception-mode flag 10_e_, the value of the compatible-mode-packet-protocol flag 15_b_, the value of the ECP-mode-packet-protocol flag 15_c_, or information in the packet header, the input data is stored in the printing-data buffer storage 10_c_ or the control-command buffer storage 10_d_.

As for printing processing performed by the LBP 1 when input data from the host apparatus 2 is stored in the printing-data buffer storage 10_c_ according to interrupt for storing the input data, the same processing as that described in the first embodiment is performed, and image data is actually output onto a recording medium.

As described above, when receiving data from the host apparatus 2 in the compatible mode, i.e., when a value "1" is stored in the compatible-mode-packet-protocol flag 15_b_, the printing apparatus operates using a packet protocol, and when a value "0" is stored in the compatible-mode-packet-protocol flag 15_b_, the printing apparatus operates using a conventional nonpacket protocol without using a packet protocol.

When receiving data from the host apparatus 2 in the ECP mode, the printing apparatus operates using a packet protocol if a value "1" is stored in the ECP-mode-packet-protocol flag 15_c_, and operates using a nonpacket protocol without using a packet protocol if a value "0" is stored in the ECP-mode-packet-protocol 15_c_.

That is, in accordance with the used reception mode, the user refers to the compatible-mode-packet-protocol flag 15_b_ or the ECP-mode-packet-protocol 15_c_ which has been set in advance for each reception mode, and operates in accordance with the contents of the concerned flag. It is thereby possible to perform an operation desired by the user.

The second embodiment is particularly effective when whether or not a packet protocol is to be used depends on a communication mode, for example, in a case in which data transmission is performed using a conventional nonpacket protocol when the host apparatus side transmits data in the compatible mode, and data transmission is performed using a packet protocol when the host apparatus side transmits data in the ECP mode. This is because whether or not a packet protocol is to be used can be automatically determined if a packet flag for each communication mode is appropriately set.

Although in the second embodiment, the case of setting the mode to be used from the panel device 5 has been described, the setting method is not limited to such a method, and setting may be performed by any other appropriate method. For example, setting may be performed by an instruction from the host apparatus (since an example of such setting has been described in the first embodiment, further description thereof will be omitted).

The characteristic configuration of the second embodiment will now be described with reference to FIG. 14 and other figures.

A data processing method for a communication control apparatus (the controller 3) for performing two-way communication processing with a data processing apparatus (the host apparatus 2) via a predetermined interface having the above-described configuration (in the second embodiment, a two-way communication interface conforming to the IEEE 1284.4, such as a Centronics interface) according to a plurality of communication modes, or a storage medium storing a program capable of being read by a computer for controlling an apparatus for performing two-way communication processing with a data processing apparatus via a predetermined interface according to a plurality of communication modes includes a storage step of storing data received from the data processing apparatus in one of regions of a memory capable of securing a plurality of memory regions for storing the received data (step (1) shown in FIG. 14), a setting step of setting the type of a protocol to be used for the communication processing for each communication mode (preprocessing of step (1) shown in FIG. 14, not shown), a determination step of determining whether or not the type of the protocol set in the setting step for each communication mode indicates a packet protocol (steps (2) and (3) shown in FIG. 14), and a transfer step of transferring respective data to different regions in the memory when the determination step has determined that the type of the protocol set for each communication mode indicates a packet protocol (step (4) or (6) shown in FIG. 14). Hence, the user or the like can set whether or not a specific packet protocol is to be used for each communication mode, and it is possible to freely construct a data communication environment capable of flexibly dealing with the user's request of packet communication.

Third Embodiment

In the first and second embodiments, the case of operating in accordance with setting indicating whether or not a packet protocol is to be used has been described. However, it is also possible to determine whether or not a packet protocol is to be used according to whether a specific signal line assumes "High" or "Low". A third embodiment of the present invention which performs such an approach will now be described. In order to simplify the description, only data transmission from a host apparatus to a printer will be described.

Figure 15:
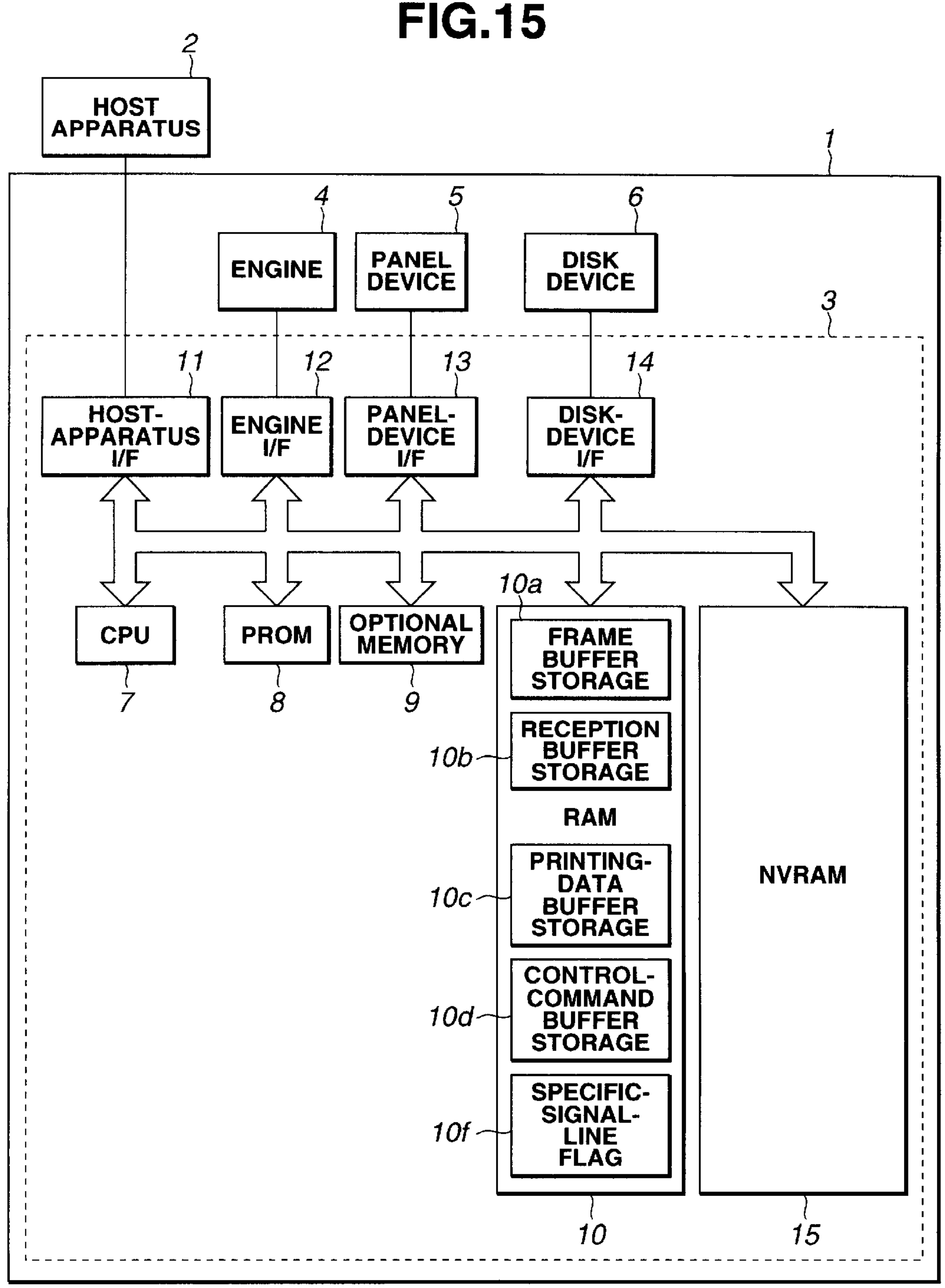
FIG. 15 is a block diagram illustrating the configuration of a printing system to which a printing control apparatus can be applied according to a third embodiment of the present invention.

FIG. 15 is a block diagram illustrating the configuration of a printing system to which a printing control apparatus can be applied according to the third embodiment. In FIG. 15, the same components as those shown in FIG. 1 are indicated by the same reference numerals. The configuration of FIG. 15 differs from that of FIG. 1 only in the RAM 10 and the NVRAM 15.

In FIG. 15, a RAM 10 includes regions, such as a frame buffer storage 10*a* for storing image data, a reception buffer storage 10*b* for temporarily storing data input from a host apparatus 2, such as printing data and the like, a printing-data buffer storage 10*c* for storing printing data, a control-command buffer storage 10*d* for storing control commands, and the like. In addition, a specific-signal-line flag 10*f* is secured in the RAM 10.

A value "0" or "1" is stored in the specific-signal-line flag 10*f* in accordance with whether or not the signal line when storing input data in the reception buffer storage 10*b* assumes "High" or "Low", respectively. The RAM 10 is also used as a working area for a CPU 7. An NVRAM 15 is used as a region for storing various setting values.

Various rules of selection can be considered as for which signal line is to be actually used as a "specific signal line" represented by the specific-signal-line flag 10*f*.

For example, as the first rule of selection in the case of a Centronics interface, a signal line which is in a state of "Not defined" according to the IEEE 1284 standards is used. This is because such a signal line is defined such that "the maker can use such a line on his own responsibility".

Figures 22, 23:
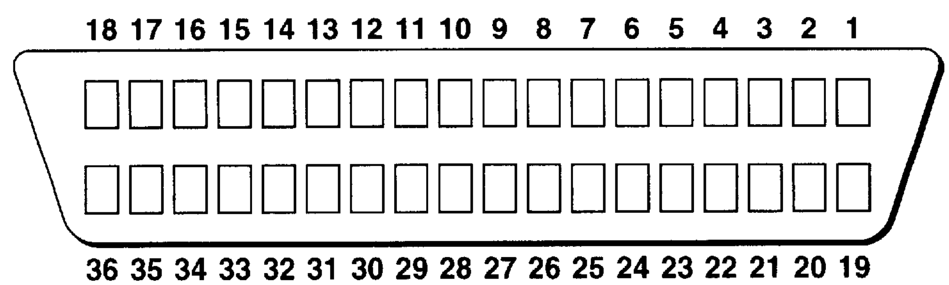
FIG. 22 is a plan view illustrating the configuration of a pin arrangement of a printer interface in a printing system to which a communication control apparatus can be applied.
FIG. 23 is a timing chart illustrating a state of data transfer processing in the printing system.
Figure 27:
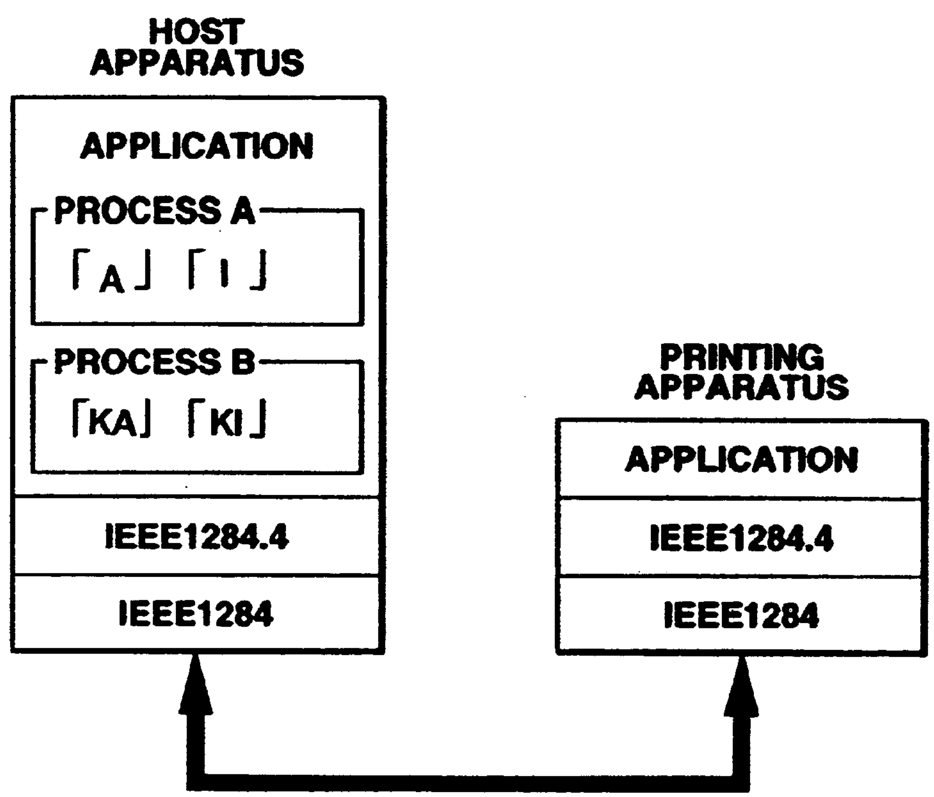
FIGS. 27 through 31 are diagrams illustrating the concept of a multichannel operation in the communication interface of the printing apparatus.
Figure 28:
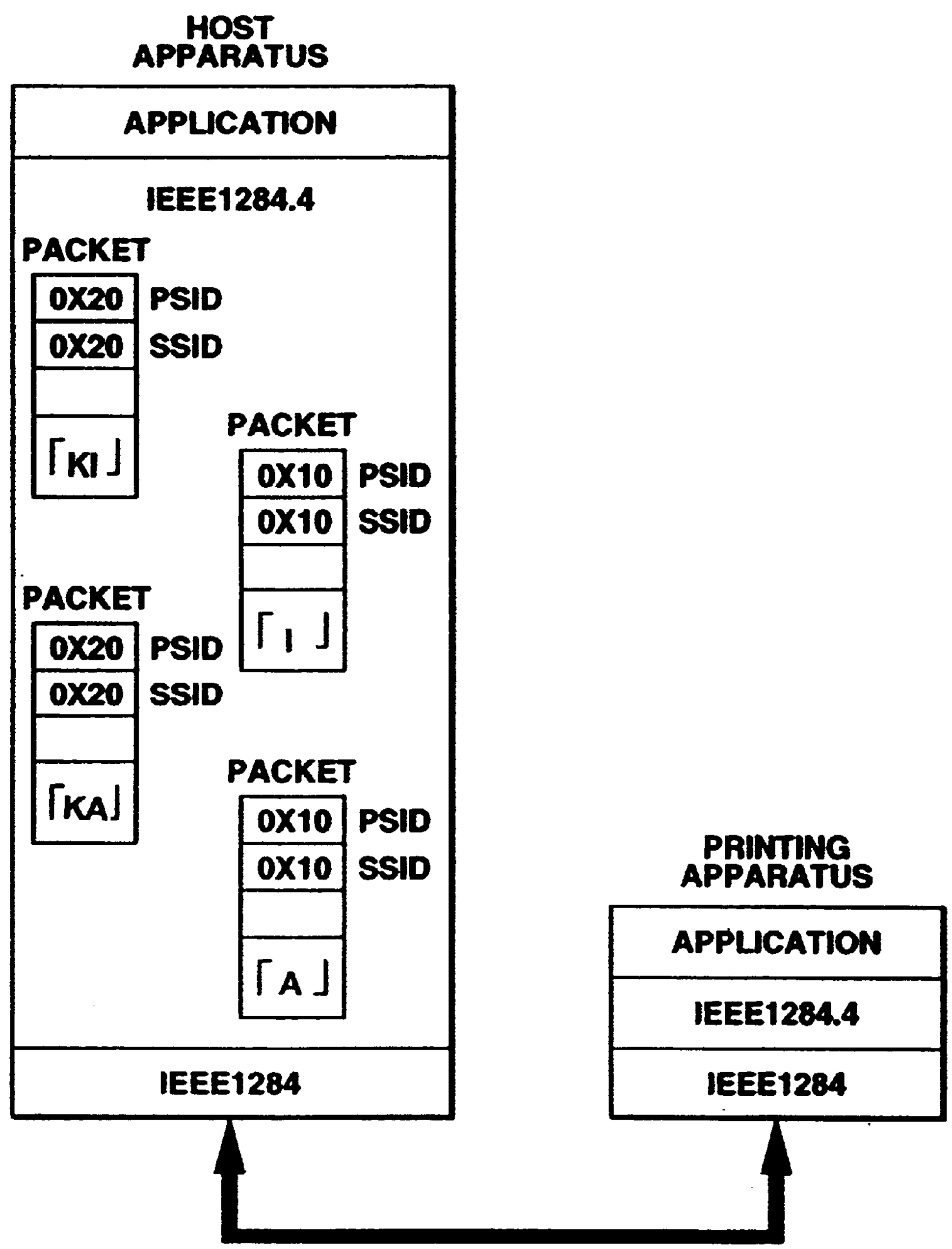
Figure 29:
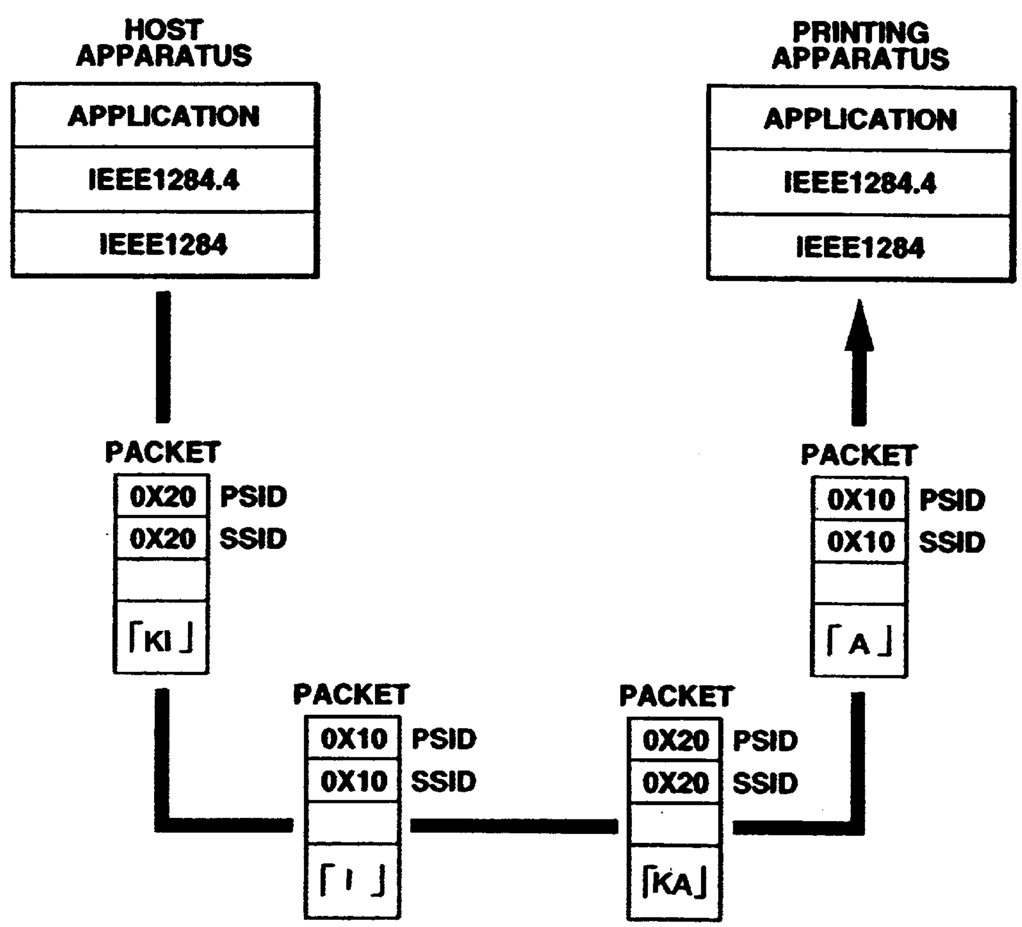
Figure 30:
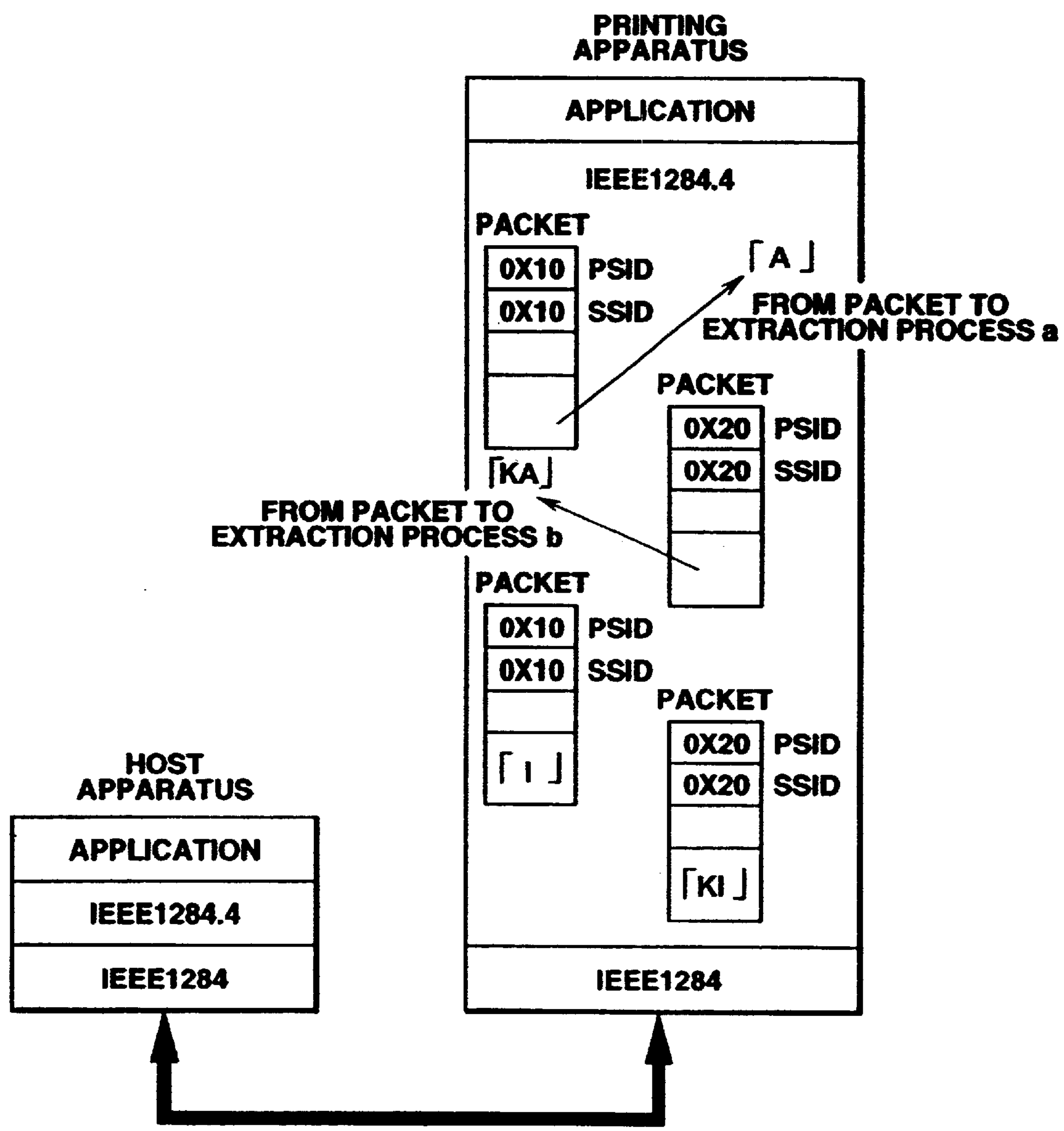
Figure 31:
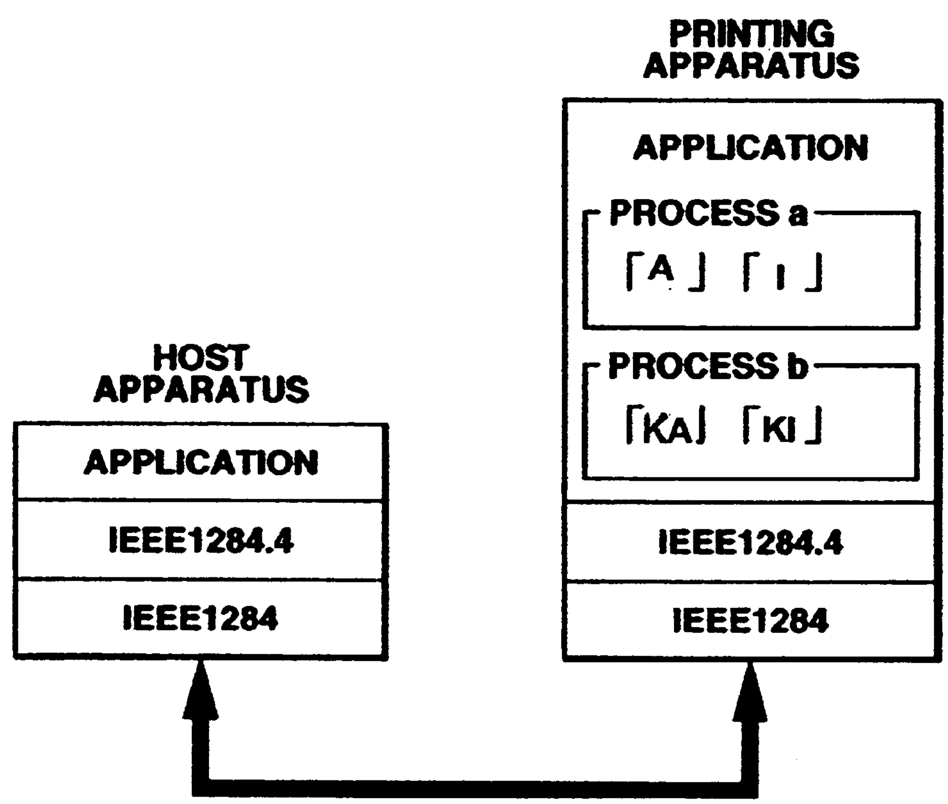
Figure 33:
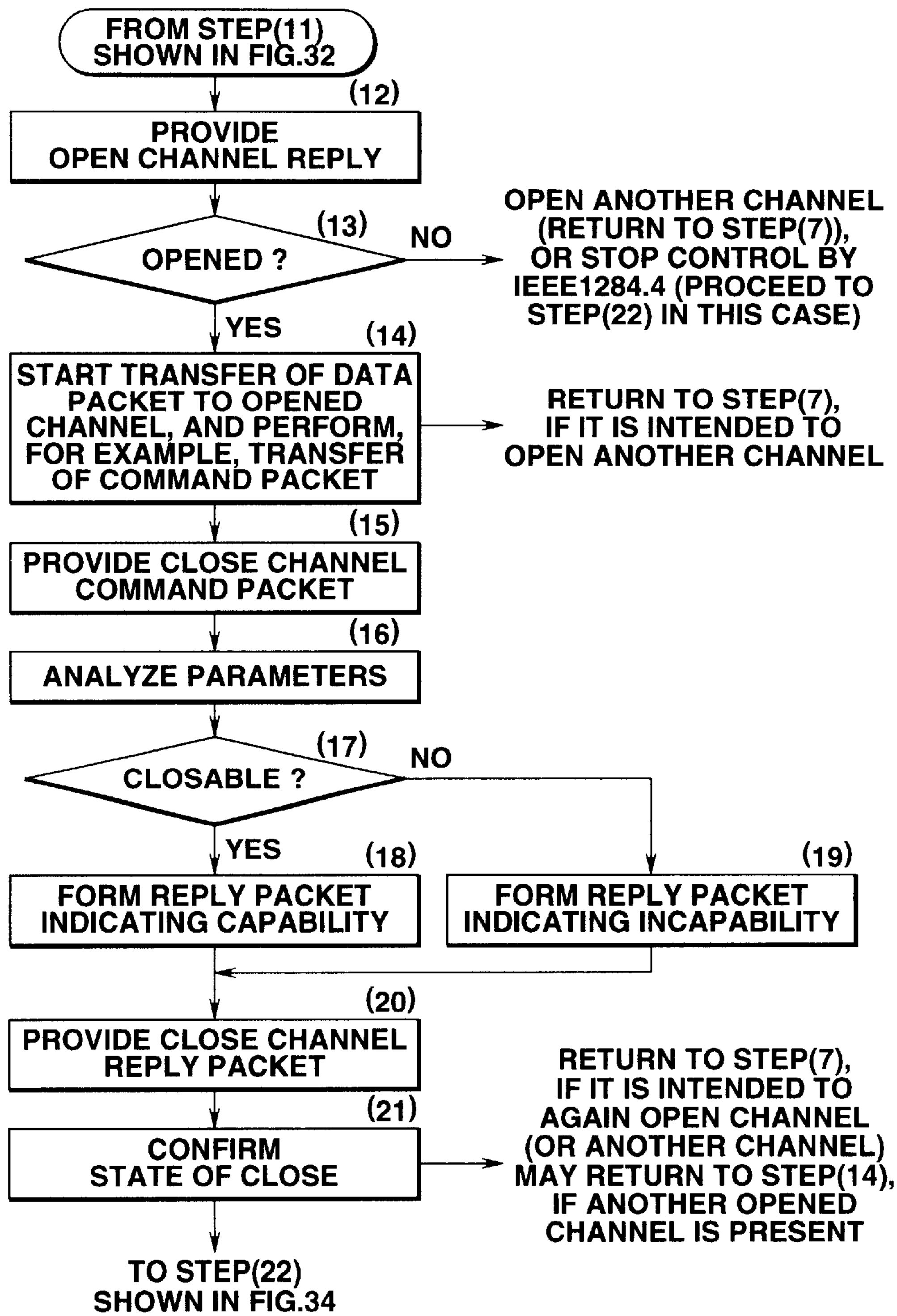
Figure 34:
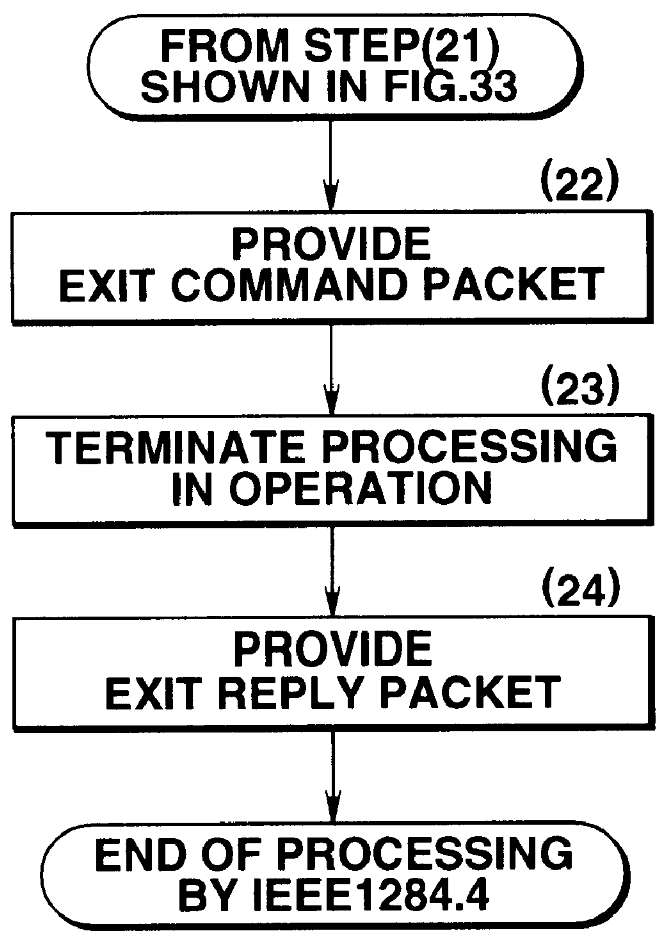

As the second rule of selection, a signal line which is not currently used and whose "High" or "Low" state does not influence any other lines, such as the line AUTO FD (a signal line corresponding to the fourteenth pin shown in FIG. 22), is used.

An operation from the transmission of data from the host apparatus 2 to an LBP 1 to the execution of printing processing will now be described. In order to simplify the description, it is assumed that in a conventional nonpacket mode, only printing data is transmitted, and control commands are not transmitted.

When data is input from the host apparatus 2 to the LBP 1 via a host-apparatus I/F 11, notification of interrupt instructing storage of input data is performed for the CPU 7. At this notification of interrupt, a value "1" or "0" is stored in the specific-signal-line flag 10*f* secured in the RAM 10 shown in FIG. 15, depending on whether the signal line assumes "High" or "Low", respectively.

That is, when the specific signal line assumes "Low", a value "0" is stored in the specific-signal-line flag 10*f*, and when the specific signal line assumes "High", a value "0" is stored in the specific-signal-line flag 10*f*.

A case in which the signal line AUTO FD is used as the specific signal line will now be described with reference to FIGS. 16 and 17.

Figure 16:
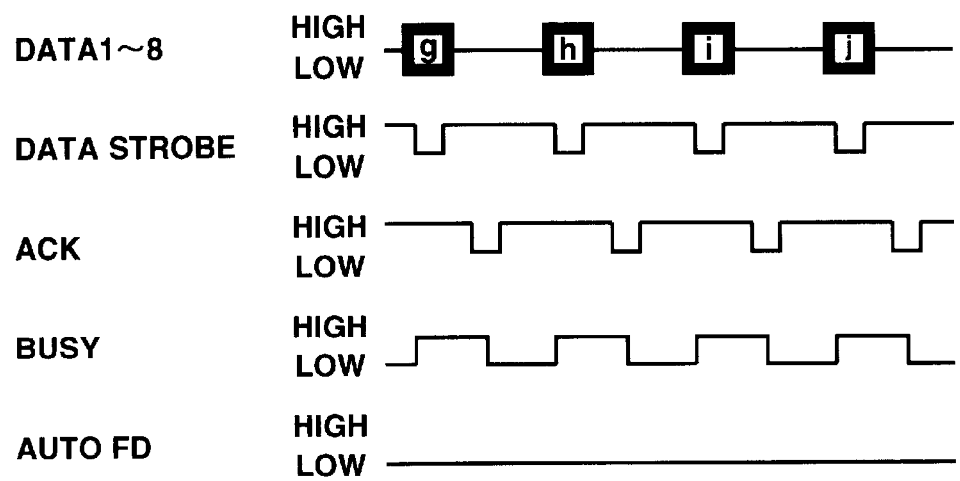
FIGS. 16 and 17 are timing charts illustrating a state of data communication in a communication control apparatus according to the third embodiment.
Figure 17:
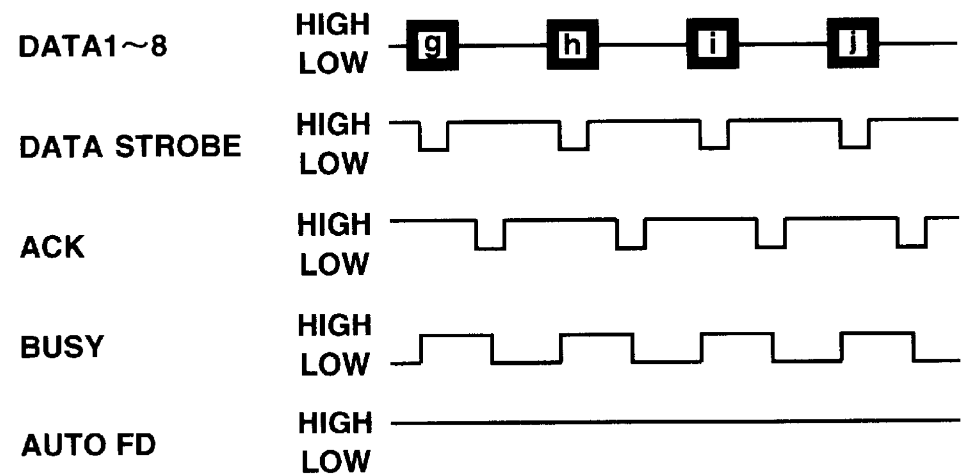

FIGS. 16 and 17 are timing charts, each illustrating a data communication state in a communication control apparatus according to the third embodiment. FIG. 16 corresponds to a case in which, when data is input from the host apparatus 2 to the LBP 1, a value "0" is stored in the specific-signal-line flag 10*f* secured in the RAM 10 because the signal line AUTO FD assumes "Low". FIG. 17 corresponds to a case in which, when data is input from the host apparatus 2 to the LBP 1, a value "1" is stored in the specific-signal-line flag 10*f* because the signal line AUTO FD assumes "High". The specific-signal-line flag 10*f* may be stored in the NVRAM 15.

In FIGS. 16 and 17, DATA1–DATA8 are data lines, and correspond to information relating to the 0th–7th bits, respectively, of data transmitted from the host apparatus 2.

DATA STROBE represents a data strobe line, which assumes a "High" state in a stationary state. When the DATA STROBE assumes a "Low" state, the LBP 1 reads the states of the data lines DATA1–DATA8. ACK represents an acknowledge line, which assumes the "High" state in a stationary state. A pulse for providing the "Low" state is generated when the state shifts from the stationary state.

BUSY represents a busy line, on which a state signal indicating whether or not the LBP 1 can receive data from the host apparatus 2. The "Low" state represents a state in which a signal can be received, and the "High" state represents a state in which a signal cannot be received.

The characteristic configuration of the third embodiment will now be described with reference to FIG. 15 and other figures.

A communication control apparatus (a controller 3) for performing two-way communication processing with a data processing apparatus (the host apparatus 2) via a predetermined interface having a predetermined number of communication lines configured as described above (in the third embodiment, a two-way communication interface conforming to the IEEE 1284.4, such as a Centronics interface) includes a storage unit capable of securing a plurality of memory regions for storing data received from the data processing apparatus (the RAM 10 where the frame buffer storage 10*a*, the reception buffer storage 10*b*, the printing-data buffer storage 10*c*, the control-command buffer storage 10*d* and the like are secured), a detection unit for detecting the state of a specific communication line from among the plurality of communication lines (the CPU 7 detects "Low/High" of the specific signal line of the host-apparatus interface 11), a determination unit for determining whether or not the type of the protocol for data communication indicates a packet protocol (the CPU 7 determines from the state of setting of the specific-signal-line flag 10*f* set based on the result of the detection of "Low/High" of the specific signal line of the host-apparatus interface 11), and a control unit for changing destination of each data by determining the type of data in the received data stored in the storage unit when the determination unit has determined that the type of the protocol indicates a packet protocol (the CPU 7 controls the destination of the data to one of the printing-data buffer storage 10*c* and the control-command buffer storage 10*d* by executing a control program stored in the PROM 8). Hence, it is possible to automatically determine and set whether or not a specific packet protocol is to be used, and to freely construct a data communication environment capable of flexibly dealing with a request of packet communication.

The CPU 7 discriminates control commands from data other than the control commands in a portion other than the header portion within the received data, and moves the respective data to different memory regions (the control-command buffer storage 10*d* and the printing-data buffer storage 10*c*). Hence, it is possible to discriminate control commands peculiar to the packet protocol from other data, and normally process the respective data.

Since the data other than the control commands is used as printing data, it is possible to assuredly prevent a case in which a control command is processed as printing data, and to perform processing of printing data for obtaining a normal printing result.

Processing for storing input data which is executed by the controller 3 will now be described with reference to the flowchart shown in FIG. 18.

Figure 18:
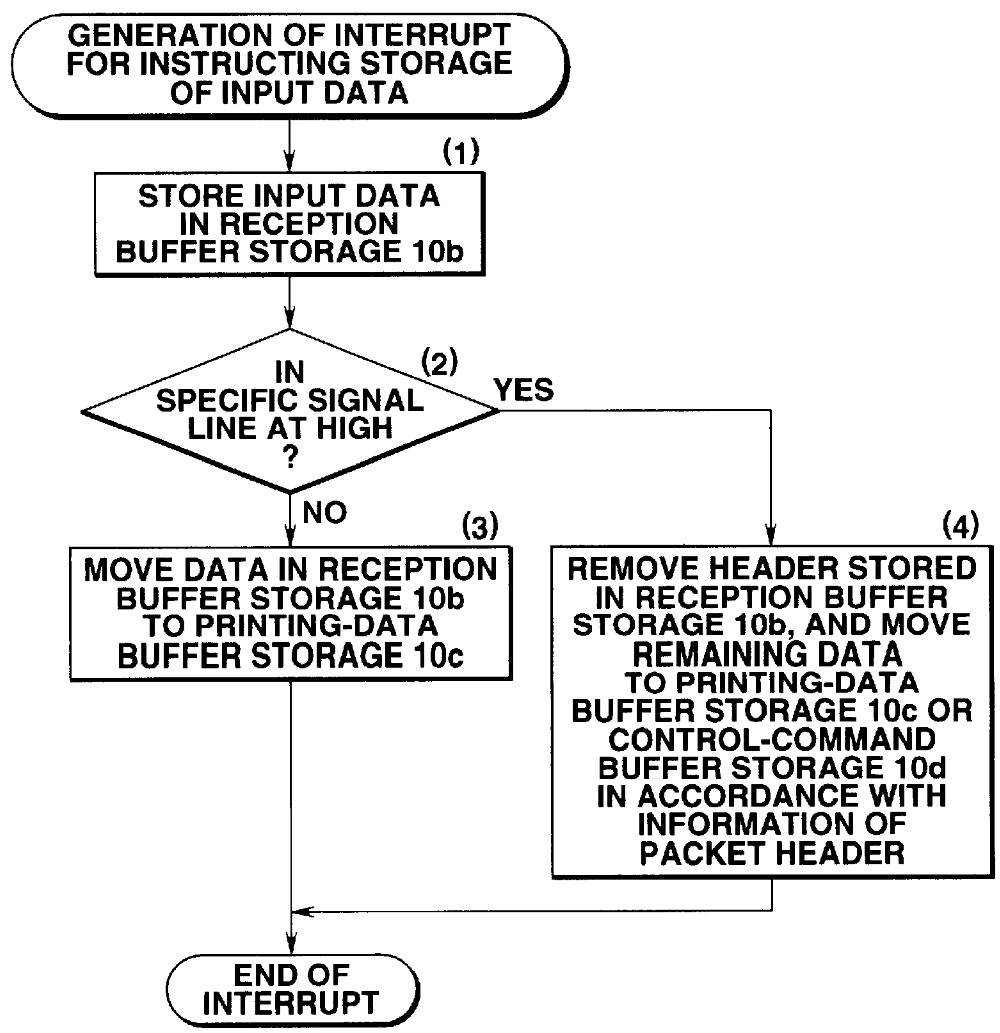
FIG. 18 is a flowchart illustrating a data processing procedure in the communication control apparatus according to the third embodiment.

FIG. 18 is a flowchart illustrating a data processing procedure in the communication control apparatus according to the third embodiment. In FIG. 18, numerals (1)–(4) represent respective steps.

When notification of interrupt for instructing storage of input data has been provided from the host apparatus 2, then, in step (1), the CPU 7 stores the input data into the reception buffer storage 10*b* via the host-apparatus I/F 11. When all the input data has been stored, then, in step (2), the value of the specific-signal-line flag 10*f* secured in the RAM 10 is referred to. Different control is performed depending on whether the value of the specific-signal-line flag 10*f* is "0" or "1". That is, when the specific-signal-line flag 10*f* is determined to have a value "0", that indicates that a packet protocol is not to be used. Hence, the process proceeds to step (3), where data in the reception buffer storage 10*b* is moved to the printing-data buffer storage 10*c*. Then, the interrupt processing is terminated.

On the other hand, when the value of the specific-signal-line flag 10*f* is "1", that indicates that a packet protocol is to be used. Hence, the process proceeds to step (4), where the data of the reception buffer storage 10*b* is moved to one of the printing-data buffer storage 10*c* and the control-command buffer storage 10*d* in accordance with information indicated in the packet header. At that time, only a portion other than the packet header is moved. Then, the interrupt processing is terminated.

As described above, according to interrupt occurred every time data is input from the host apparatus 2, the input data is stored in the reception buffer storage 10*b*. Then, in accordance with the value of the specific-signal-line flag 10*f* or information in the packet header, the input data is stored in the printing-data buffer storage 10*c* or the control-command buffer storage 10*d*.

Next, a description will be provided of an outline of printing processing performed by the LBP 1 when input data from the host apparatus 2 is stored in the printing-data buffer storage 10*c* according to interrupt for storing the input data, with reference to FIG. 15.

When the CPU 7 has recognized that the input data has been stored in the printing-data buffer storage 10*c*, the CPU 7 interprets printing data stored in the printing-data buffer storage 10*c* by referring to a printing-data analysis program stored in a PROM 8, and converts the printing data into image data. The image data provided by the CPU 7 is stored in the frame buffer storage 10*a*.

The CPU 7 continues the processing by referring to the printing-data analysis program in the above-described manner. When the CPU 7 has found a sheet discharging command in the printing data, the CPU 7 transmits the image data stored in the frame buffer storage 10*a* to an engine 4 via an engine I/F 12. Upon reception of the image data transmitted from the CPU 7 via the engine I/F 12, the engine 4 provides printing output of the image data onto an actual recording medium.

As described above, when data has been input from the host apparatus 2, the LBP 1 performs printing processing, and image data is actually output onto a recording medium. Ad described above, when a value "1" is stored in the specific-signal-line flag 10*f*, the printing apparatus operates using a packet protocol, and when a value "0" is stored in the specific-signal-line flag 10*f*, the printing apparatus operates using a conventional nonpacket protocol without using the packet protocol.

That is, by operating depending on whether or not the signal line when storing input data in the reception buffer storage 10*b* is the "High" state or the "Low" state, it is possible to operate by automatically determining whether or not the packet protocol is to be used.

The characteristic configuration of the third embodiment will now be described with reference to FIG. 18 and other figures.

A data processing method for a communication control apparatus (the controller 3) for performing two-way communication processing with a data processing apparatus (the host apparatus 2) via an interface having a predetermined number of communication lines configured in the above-described manner (in the third embodiment, a two-way communication interface conforming to the IEEE 1284.4, such as a Centronics interface), or a storage medium storing a program capable of being read by a computer for controlling an apparatus for performing two-way communication processing with a data processing apparatus via an interface having a predetermined number of communication lines includes a storage step of storing data received from the data processing apparatus in one of regions of a memory capable of securing a plurality of memory regions for storing the received data (step (1) shown in FIG. 18), a detection step of detecting the state of a signal on a specific communication line from among the plurality of communication lines (step (2) shown in FIG. 18), a determination step of determining whether or not the type of the protocol for data communication indicates a packet protocol based on the result of the detection of the state of the signal on the specific signal line in the detection step (step (2) shown in FIG. 18), and a transfer step of transferring respective data to different regions in the memory by determining the type of data in the received data stored in some region of the memory when the determination step has determined that the type of the protocol indicates a packet protocol (step (3) or step (4) shown in FIG. 18). Hence, it is possible to automatically determine and set whether or not a specific packet protocol is to be used, and to freely construct a data communication environment capable of flexibly dealing with a request of packet communication.

Examples of the processing of step (3) and the processing of step (4) shown in FIG. 18 will now be described with reference to FIGS. 19 and 20.

Figure 19:
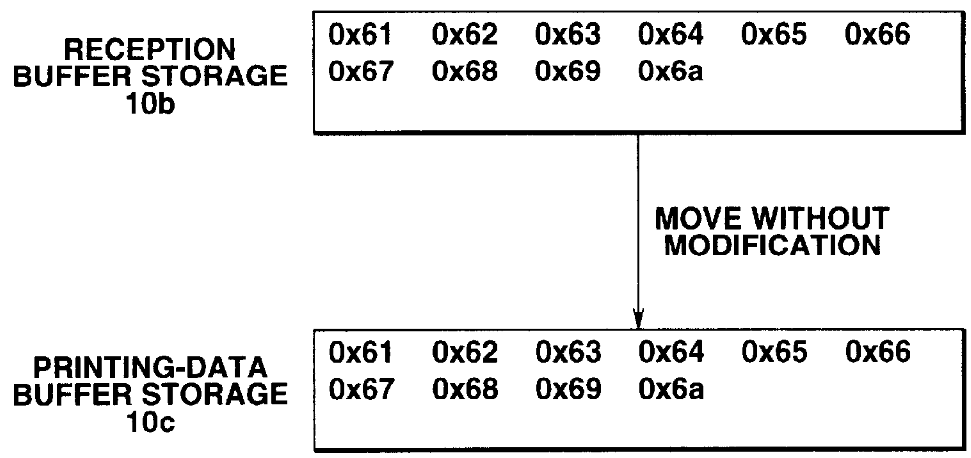
FIGS. 19 and 20 are diagrams, each illustrating processing of moving received data in the communication control apparatus according to the third embodiment.
Figure 20:
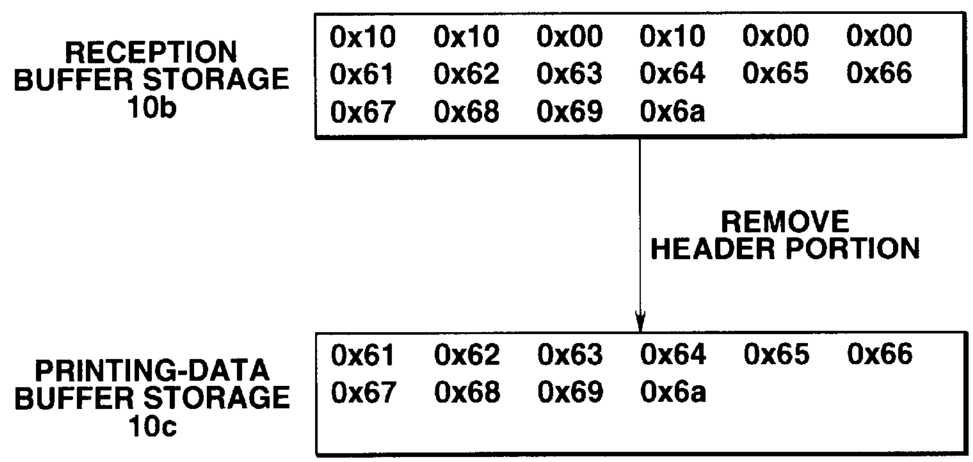

FIGS. 19 and 20 are diagrams, each illustrating processing of moving received data in the communication control apparatus according to the third embodiment. FIG. 19 corresponds to data movement from the reception buffer storage 10*b* to the printing-data buffer storage 10*c* when the specific signal line assumes the "Low" state. FIG. 20 corresponds to data movement from the reception buffer storage 10*b* to the printing buffer storage 10*c* when the specific signal line assumes the "High" state.

When the result of the determination is negative in step (2) of the flowchart shown in FIG. 18, then, in step (3), the data string stored in the reception buffer storage 10*b* is moved to the printing-buffer storage 10*c* without modification.

On the other hand, when the result of the determination is affirmative in step (2) of the flowchart shown in FIG. 18, then, in step (4), a data string obtained by removing the 6-byte packet header from the data stored in the reception buffer storage 10*b* is moved to the printing-data buffer storage 10*c* or the control-command buffer storage 10*d*.

In this case, the location where data is to be moved and the size of data to be moved are determined from the information of the packet header. The data is determined to be moved to the printing buffer storage 10*c* based on the combination of Socket IDs (PSID=0X10, SSID=0X10) of the first byte 0x10 and the second byte 0x10 of the packet header.

It can be understood that the size of the packet including the packet header is 0x0010 bytes based on the third byte 0x00 and the fourth byte 0x10 of the packet header. Hence, the size of data other than the packet header is 10 bytes (0x0010–0x0006=0x000a) in decimal notation.

Accordingly, as shown in FIG. 20, 10-byte data obtained by removing the packet header from data stored in the reception buffer storage 10*b* is moved to the printing-data buffer storage 10*c*.

The third embodiment is particularly effective when the use of a packet protocol depends on whether a specific signal line assumes "High" or "Low", for example, in a case in which, when the host apparatus side transmits data using a conventional nonpacket protocol, the specific signal line is made "Low", and when the host apparatus side transmits data using a packet protocol, the specific signal line is made "High". This is because it is possible to normally operate by automatically determining whether or not a packet protocol is to be used.

In the third embodiment, the case of using a printer as an apparatus capable of communicating with a host apparatus has been described. However, the present invention may also be applied to any other computer peripheral apparatus, including an image input/output apparatus (a printer, a scanner device or the like), for performing data processing by communicating with a host apparatus, irrespective of the type of data processing.

In the third embodiment, the case of using an interface conforming to the IEEE 1284.4 has been described. However, the present invention may also be applied to an interface conforming to any other IEEE standards, a USB (Universal Serial Bus) or the like.

A description will now be provided of the configuration of a data processing program capable of being read by a printing system to which a communication control apparatus according to the present invention can be applied, with reference to the memory map shown in FIG. 21.

FIG. 21 is a diagram illustrating the memory map of a storage medium storing various data processing programs capable of being read by the communication control apparatus according to the present invention.

Although not illustrated, information for controlling a group of programs stored in the storage medium, comprising version information, authors and the like, is also stored. In addition, information depending on an OS (operating system) of the program reading side, comprising icons for identifying and displaying respective programs, and the like, may also be stored.

Furthermore, data belonging to various programs are also controlled by directory. Programs for installing various programs in the computer, programs for defrosting compressed programs to be installed, and the like are, in some cases, also stored.

The functions shown in FIGS. 12, 14 and 18 in the second and third embodiments may be executed by the host computer based on a program installed from the outside. In such a case, the present invention is also applied to a case in which a group of information including programs is supplied from a storage medium, such as CD(compact disc)-ROM, a flash memory, an FD (floppy disk) or the like, or from an external storage medium via a network to the output apparatus.

As described above, the objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the new functions of the present invention, so that the storage medium storing the program codes constitutes the present invention. For example, a floppy disk, a hard disk, an optical disk, a magnetooptical disk, a CD-ROM, a CD-R(recordable), a magnetic tape, a nonvolatile memory card, a ROM, an EEP(electrically erasable and programmable)ROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

The individual components shown in outline or designated by blocks in the drawings are all well known in the interface control apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication control apparatus for communicating with a data processing apparatus via a predetermined interface, said communication control apparatus comprising:

a setting unit adapted to set whether or not a packet protocol is to be used to receive data from the data processing apparatus in accordance with a manual instruction, wherein a packet header is added to the data in the packet protocol; and a control unit adapted to, in a case in which the packet protocol is set to be used, store the received data in a first memory area or a second memory area in accordance with the packet header, and, in a case in which the packet protocol is not set to be used, store the received data in the first memory area.

2. A communication control apparatus according to claim 1, further comprising a detection unit adapted to detect a state of a signal on each of a plurality of communication lines of the interface, wherein said control unit determines whether or not the packet protocol is to be used in accordance with the state of the signal.

3. A communication control method between a first apparatus and a second apparatus via a predetermined interface, said method comprising the steps of:

setting whether or not a packet protocol is to be used to communicate data between the first apparatus and the second apparatus in accordance with a manual instruction, wherein a packet header is added to the data in the packet protocol;

storing, in a case in which the packet protocol is set to be used, the data in a first memory area or a second memory area in accordance with the packet header; and storing, in a case in which the packet protocol is not set to be used, the data in the first memory area.

4. A method according to claim 3, further comprising a detection step of detecting a state of a signal on each of a plurality of communication lines of the interface, wherein whether or not the packet protocol is to be used is determined in accordance with the state of the signal.

5. A storage medium storing a computer-readable control program for implementing a communication control method between a first apparatus and a second apparatus via a predetermined interface, the control program comprising:

code for setting whether or not a packet protocol is to be used to communicate data between the first apparatus and the second apparatus in accordance with a manual instruction, wherein a packet header is added to the data in the packet protocol;

code for a first storage step of storing, in a case in which the packet protocol is set to be used, the data in a first memory area or a second memory area in accordance with the packet header; and code for a second storage step of storing, in a case in which the packet protocol is not set to be used, the data in the first memory area.

6. A communication control apparatus according to claim 1, wherein, in a case in which the packet protocol is set to be used, said control unit discriminates whether the received data is print data or a control command in accordance with the packet header, stores the print data in the first memory area, and stores the control command in the second memory area.

7. A communication control apparatus according to claim 1, wherein said setting unit sets whether or not the packet protocol is to be used in accordance with the manual instruction from a panel device or a host computer.

8. A method according to claim 3, further comprising a discrimination step of, in a case in which the packet protocol is set to be used, discriminating whether the data is print data or a control command in accordance with the packet header, storing the print data in the first memory area, and storing the control command in the second memory area.

9. A method according to claim 3, wherein whether or not the packet protocol is to be used is set in accordance with the manual instruction from a panel device or a host computer.

10. A communication control apparatus for communicating with a data processing apparatus via a predetermined interface, said communication control apparatus comprising:

a setting unit adapted to set whether a first transfer method or a second transfer method is to be used to receive data from the data processing apparatus in accordance with a manual instruction, wherein, in the first transfer method, print data and a control command are received, and wherein, in the second transfer method, print data is received; and a control unit adapted to, in a case in which the first transfer method is set to be used, store the received data in a first memory area or a second memory area in accordance with a packet header, and, in a case in which the second transfer method is set to be used, store the received data in the first memory area.

11. A communication control apparatus for communicating with a data processing apparatus via a predetermined interface, said communication control apparatus comprising:

a setting unit adapted to set whether or not a packet protocol is to be used to receive data from the data processing apparatus, wherein a packet header is added to the data in the packet protocol;

a memory unit adapted to store information for indicating whether or not the packet protocol is set to be used; and a control unit adapted to, in a case in which the stored information indicates that the packet protocol is set to be used, store the received data in a first memory area or a second memory area in accordance with the packet header, and, in a case in which the stored information does not indicate that the packet protocol is set to be used, store the received data in the first memory area.

12. A communication control apparatus according to claim 11, wherein said setting unit sets whether or not the packet protocol is to be used in accordance with a manual instruction inputted from a panel device or a host computer.

13. A communication control apparatus according to claim 11, wherein said memory unit is a nonvolatile memory and the information is stored in the nonvolatile memory in response to the manual instruction.

* * * * *